(12) United States Patent
Ouammi et al.

(10) Patent No.: US 11,684,025 B2
(45) Date of Patent: Jun. 27, 2023

(54) CENTRALIZED PREDICTIVE CONTROLLER FOR MANAGEMENT AND OPTIMAL OPERATION OF MICROGRID POWERED GREENHOUSES

(71) Applicant: QATAR UNIVERSITY, Doha (QA)

(72) Inventors: Ahmed Ouammi, Doha (QA); Yasmine Achour, Rabat (MA); Driss Zejli, Rabat (MA); Hanane Dagdougui, Montreal (CA)

(73) Assignee: QATAR UNIVERSITY, Doha (QA)

( * ) Notice: Subject to any disclaimer, the term of this patent is extended or adjusted under 35 U.S.C. 154(b) by 545 days.

(21) Appl. No.: 16/909,628

(22) Filed: Jun. 23, 2020

(65) Prior Publication Data
US 2021/0400885 A1 Dec. 30, 2021

(51) Int. Cl.
*A01G 9/26* (2006.01)
*G05B 13/04* (2006.01)
(Continued)

(52) U.S. Cl.
CPC .................. *A01G 9/26* (2013.01); *A01G 9/18* (2013.01); *A01G 9/24* (2013.01); *A01G 9/241* (2013.01);
(Continued)

(58) Field of Classification Search
CPC ........ A01G 9/24; G05B 13/048; H02S 10/12; H02S 10/20
See application file for complete search history.

(56) References Cited

U.S. PATENT DOCUMENTS

2016/0334825 A1 11/2016 Nesler et al.

FOREIGN PATENT DOCUMENTS

CN 105843299 A 8/2016

OTHER PUBLICATIONS

Shen, Y.; Wei, R.; Xu, L. Energy Consumption Prediction of a Greenhouse and Optimization of Daily Average Temperature. Energies Nov. 2018, 65. https://doi.org/10.3390/en11010065 (Year: 2018).*
(Continued)

*Primary Examiner* — Daniel Cavallari
(74) *Attorney, Agent, or Firm* — Squire Patton Boggs (US) LLP

(57) ABSTRACT

Systems, methods, apparatuses, and computer program products for a greenhouse indoor environment controller based on model predictive control (MPC), which can be integrated into existing greenhouse regulatory systems to optimally maintain critical climatic variables, including artificial lighting levels, $CO_2$, indoor temperature, and humidity levels within acceptable limits. The objectives of the MPC may be to maximize the rate of crop photosynthesis while optimizing the use of the available water and energy resources, taking into account the unpredictability and intermittent nature of renewable energies and external atmospheric conditions. Accordingly, certain embodiments may facilitate the management of greenhouses by anticipating control actions for a better quality of production. For that, mathematical formulations of the optimal control problem may be described, and the numerical results related to the application of the MPC to case studies are described integrating the effects of greenhouse structural considerations and the influence of climate data on its operation.

20 Claims, 15 Drawing Sheets

(51) Int. Cl.
  A01G 9/24    (2006.01)
  A01G 9/18    (2006.01)
  H02S 10/20   (2014.01)
  H02S 10/12   (2014.01)
(52) U.S. Cl.
  CPC ............ *A01G 9/243* (2013.01); *A01G 9/246* (2013.01); *A01G 9/247* (2013.01); *A01G 9/249* (2019.05); *G05B 13/048* (2013.01); *H02S 10/12* (2014.12); *H02S 10/20* (2014.12)

(56) References Cited

OTHER PUBLICATIONS

Jiaoliao Chen, Fang Xu, Dapeng Tan, Zheng Shen, Libin Zhang, Qinglin Ai, A control method for agricultural greenhouses heating based on computational fluid dynamics and energy prediction model, Applied Energy, vol. 141, 2015, pp. 106-118, ISSN 0306-2619. (Year: 2015).*
Ahmed Ouammi et al., "Supervisory Model Predictive Control for Optimal Energy Management of Networked Smart Greenhouses Integrated Microgrid", IEEE Transactions on Automation Science and Engineering, http://www.ieee.org/publications_standards_/publications/rights/index.html, 12 pages.
Andrzej Pawlowski et al., "Predictive Control with Disturbance Forecasting for Greenhouse Diurnal Temperature Control", Proceedings of the 18th World Congress the International Federation of Automatic Control Milano (Italy) Aug. 28-Sep. 2, 2011, 6 pages.
Wikipedia, "Greenhouse", Jun. 7, 2020, https://en.wikipedia.org/wiki/Greenhouse, 11 pages.
Armando Ramirez-Arias et al., "Improving Efficiency of Greenhouse Heating Systems Using Model Predictive Control", 16th Triennial World Congress, Prague, Czech Republic, Elsevier IFAC Publications, 6 pages.
G. Notton, et al., "Decentralized Wind Energy Systems Providing Small Electrical Loads in Remote Areas", International Journal of Energy Research, Int. J. Energy Res. 2001; 25:141-164, 24 pages, Centre de Recherches "Energie et Systemes", Université de Corse, U.R.A. CNRS 2053, Route des Sanguinaires, Ajaccio F-20000, France.
Margit Olle, et al., "The Effects of Light-Emitting Diode Lighting on Greenhouse Plant Growth and Quality", Agricultural and Food Science (2013) 22:223-234, 12 pages, Institute of Horticulture at Lithuanian Research Centre for Agriculture and Forestry, 30 Kaunas Str., Babtai, Kaunas distr., LT-54333, Lithuania.
Bogdan Otomega, et al., "Model Predictive Control to Alleviate Thermal Overloads", IEEE Transactions on Power Systems, vol. 22, No. 3, Aug. 2007, 2 pages, DOI: 10.1109/TPWRS.2007.901677.
Ahmed Ouammi, et al., "Supervisory Model Predictive Control for Optimal Energy Management of Networked Smart Greenhouses Integrated Microgrid", IEEE Transactions on Automation Science and Engineering, 12 pages, http://www.ieee.org/publications_standards/publications/rights/index.html.
Ahmed Ouammi, et al., "Coordinated Model Predictive-Based Power Flows Control in a Cooperative Network of Smart Microgrids", IEEE Transactions on Smart Grid, DOI: 10.1109/TSG.2015.2396294.
Ahmed Ouammi, "Optimal Power Scheduling for a Cooperative Network of Smart Residential Buildings", IEEE Transactions on Sustainable Energy, 10 pages, DOI: 10.1109/TSTE.2016.2527528, http://www.ieee.org/publications_standards/publications/rights/index.html.
Semih Ozden, et al., "Prediction and Modelling of Energy Consumption on Temperature Control for Greenhouses", Politeknik Dergisi, Journal of Polytechnic 2019; 22(1):213-217, URL: http://dergipark.gov.tr/politeknik/archive, 6 pages, DOI: 10.2339/politeknik, 417757.
Roop Pahuja, et al., "A Wireless Sensor Network for Greenhouse Climate Control", Pervasive Computing, 10 pages, www.computer.org/pervasive, Apr.-Jun. 2013.
Alessandra Parisio et al., "A Model Predictive Control Approach to Microgrid Operation Optimization", IEEE Transactions on Control Systems Technology, vol. 22, No. 5, Sep. 2014, 15 pages, http://www.ieee.org/publications_standards/publications/rights/index.html.
Sumit Paudyal, et al., "Optimal Operation of Industrial Energy Hubs in Smart Grids", IEEE Transactions on Smart Grid, http://www.ieee.org/publications_standards/publications/rights/index.html, 11 pages.
Howard M. Resh, "Hydroponic Food Production, a Definitive Guidebook for the Advanced Home Gardener and the Commercial Hydroponic Grower, Seventh Edition", CRC Press Taylor 7 Francis Group Boca Raton London New York, 551 pages. International Standard Book No. 13:978-1-4398-7869-9.
Taeke de Jong, "Natural Ventilation of Large Multi-Span Greenhouses", Bibliotheek Landbouwuniversiteit, Postbus, 6700 Ha Wageningen Nederland, 124 pages, ISN: 282224, Wageningen, Sep. 26, 1990.
Manuela Sechilariu, et al., "Building-integrated Microgrid: Advanced Local Energy Management for Forthcoming Smart Power Grid Communication", Energy and Buildings, journal homepage: www.elsevier.com/locate/enbuild, 8 pages, Université de Technologie de Compiégne, Avenues-GSU EA7284, rue du Docteur Schweitzer, 60203 Compiégne, France, http://dx.doi.org/10.1016/j.enbuild.2012.12.039.
Redmond Ramin Shamshiri et al., "Advances in Greenhouse Automation and Controlled Environment Agriculture: A Transition to Plant Factories and Urban Agriculture", Int J Agric & Biol Eng, vol. 11, No. 1, Jan. 2018, open access at https://www.ijabe.org, 22 pages.
Yongtao Shen, et al., "Energy Consumption Prediction of a Greenhouse and Optimization of Daily Average Femperature", Energies Nov. 2018, 65; DOI: 10.3390/en11010065, www.mdpi.com/journal/energies, College of Electronics and Information Engineering, Tongji University, Shanghai Apr. 2018, China, 17 pages.
Yuanping Su, et al., "Adaptive Fuzzy Control of a Class of MIMO Nonlinear System With Actuator Saturation for Greenhouse Climate Control Problem", IEEE Transactions on Automation Science and Engineering, http://www.ieee.org/publications_standards/publications/rights/index.html, 17 pages.
Lee SungBok, et al., "Design and Assessment of Greenhouse Using Ground Source Heat Pump System", Jun. 25, 2020, https://www.dabdirect.org/cabdirect/abstract/20133223102, 2 pages.
Mohammad Tasdighi, et al., "Residential Microgrid Scheduling Based on Smart Meters Data and Temperature Dependent Thermal Load Modeling", IEEE Transactions on Smart Grid, Apr. 27, 2013, DOI: 10.1109/TSG.2013.2261829, 9 pages, School of Electrical and Computer Engineering, University of Tehran, Tehran 11365-4563, Iran.
Y. Tong, et al, "Reductions in Energy Consumption and CO2 Emissions for Greenhouses Heated With Heat Pumps", Applied Engineering in Agriculture, vol. 28(3):401-406, 2012 American Society of Agricultural and Biological Engineers, 6 pages.
Amir Vadiee, et al., "Energy Management Strategies for Commercial Greenhouses", Applied Energy 114 (2014) 880-888, journal homepage: www.elsevier.com/locate/apenergy, Royal Institute of Technology (KTH), Energy Department, Heat and Power Division, Stockholm, Sweden, http://dx.doi.org/10.1016/j.apenergy.2013.08.089, 9 pages.
Amir Vadiee, et al., "Solar Blind System-Solar Energy Utilization and Climate Mitigation in Glassed Buildings", Energy Procedia 57 (2014) 2023-2032, www.sciencedirect.com, Energy Department, KTH, Brinellvagen 68, Stockholm, 10044, Sweden, 2013 ISES Solar World Congress, doi:10.1016/j.egypro.2014.10.067, 10 pages.
Peng Zhuang, et al., "Stochastic Multi-Timescale Energy Management of Greenhouses with Renewable Energy Sources", IEEE Transactions on Sustainable Energy, DOI: 10.1109/TSTE.2018.2854662, 13, pages, http://www.ieee.org/publications_standards/publications/rights/index.html.
Greenhouse Climate and Control Systems | Postscapes, "Smart Greenhouse Climate & Control Systems", 19 pages, https://www.postscapes.com/greenhouse-climate-and-control-systems/.

(56) References Cited

OTHER PUBLICATIONS

Yasmine Achour et al., "A Thermo-Economic Analysis of Solar Energy-based Heating Systems for Greenhouse Application", 6 pages, 978-1-7281-1182-7/18, 2018 IEEE.

Jhonam Arellano-Beltrán, et al., "A New Simple Canopy Photosynthesis Measurement System", May 15-19, 2017, University of Queretaro, 5 pages, 978-1-5386-1694-9/17, 2017 IEEE.

Ioan Aschilean, et al., "Design and Concept of an Energy System Based on Renewable Sources for Greenhouse Sustainable Agriculture", Energies Nov. 2018, 1201; doi: 10.3390/en11051201, www.mdpi.com/journal/energies, 12 pages.

M. Azaza, et al., "Smart Greenhouse Fuzzy Logic Based Contort System Enhanced With Wireless Data Monitoring", Elsevier, journal homepage: www.elsevier.com/locate/isatrans, http://dx.doi.org/10.1016/j.isatra.2015.12.006, 11 pages.

N. Bennis, et al., "Greenhouse Climate Modelling and Robust Control", Elsevier 2008, doi:10.1016/j.compag.2007.09.014, Computers and Electronics in Agriculture 61 (2008), pp. 96-107, journal homepage: www.elsevier.com/locate/compag, available online at www.sciencedirect.com, doi:10.1016/j.compag.2007.09.014.

X. Blasco, et al., "Model-based Predictive Control of Greenhouse Climate for Reducing Energy and Water Consumption", Computers and Electronics in Agriculture 55 (2007), p. 49-70, available online at www.sciencedirect.com, available online at www.sciencedirect.com, doi:10.1016/j.compag.2006.12.001.

T. Boulard, et al., "Natural Ventilation Performance of Six Greenhouse and Tunnel Types", J. Agric. Engng. Res. (1997) 67, pp. 249-266, Unite de Bioclimatologie, I.N.R.A., Site Agroparc, 84914 Avignon Cedex 9, France, ICEMAGREF BP 5055, 34033 Montpellier Cedex 1, France and Unviersity of Thessaly, School of Agriculture, Pedion Areos, 38334, Volos, Greece.

Mohammad Chehreghani Bozchalui, et al., "Optimal Energy Management of Greenhouses in Smart Grids", http://www.ieee.org/publications_standards/publications/rights/index.html, 9 pages.

Eunshin Byon, et al., "Optimal Maintenance Strategies for Wind Turbine Systems Under Stochastic Weather Conditions", IEEE Transactons on Reliability, vol. 59, No. 2, Jun. 2010, 12 pages, DOI: 10.1109/TR.2010.2046804.

Claudio A. Cañizares, et al., "Trends in Microgrid Control", IEEE Transactions on Smart Grid, vol. 5, No. 4, Jul. 2014, 15 pages, http://www.ieee.org/publications_standards/publications/rights/index.html.

R. Caponetto, et al., "Soft Computing for Greenhouse Climate Control", IEEE Transactions on Fuzzy Systems, vol. 8, No. 6, Dec. 2000, 8 pages.

Maurizio Carlini, et al., "Photovoltaic Greenhouses: Comparison of Optical and Thermal Behaviour for Energy Savings", Hindawi Publishing Corporation, Mathematical problems in Engineering, vol. 2012, Article ID 743764, 10 pages, doi: 10.1155/2012/743764, CIRDER, Tuscia University, San Camillo de Lellis Street, 01100 Virterbo, Italy.

R. Chargui, et al., "Geothermal Heat Pump in Heating Mode: Modeling and Simulation on TRNSYS", journal homepage: www.elsevier.com/locate/ijrefrig, 9 pages, http://dx.doi.org/10.1016/j.ijrefrig.2012.06.002, Laboratoire d'Energie et des Matériaux (LR11ES34), Université des Sousse, ESSTHSousse, Rue Abbassi Lamine, 4011 HSousse, Tunisia, Centre National de Recherche et des Technologies de I'Energie (CNRTE), PB 95, Hammam Lif 2015, Tunisia.

Hanane Dagdougui, et al., "A Dynamic Decision Model for the Real-Time Control of Hybrid Renewable Energy Production Systems", IEEE Systems Journal, vol. 4, No. 3, Sep. 2010, 11 pages, DOI: 10.1109/JSYST.2010.2059150.

Emiliano Dall'Anese, et al., "Distributed Optimal Power Flow for Smart Microgrids", IEEE Transactions on Smart Grid, vol. 4, No. 3, Sep. 2013, 12 pages, DOI: 10.1109/TSG.2013.2248175.

J. del Sagrado, et al., "Bayesian Networks for Greenhouse Temperature Control", Journal of Applied Logic, www.elsevier.com/locate/jal, 11 pages, Department of Informatics, Unviersity of Almeria, 04120 Almeria, Spain, The Agrifood Campus of International Excellence (ceiA3), Spain, http://doi.org/10.1016/j.jal.2015.09.006.

Ying Ding, et al., "Model Predictive Control and its Application in Agriculture: A Review", Computers and Electronics in Agriculture 151 (2018), pp. 104-117, journal homepage: www.elsevier.com/locate/compag, https://doi.org./10.1016/.compag.2018.06.004.

M. Y. El Ghoumari, et al., "Non-Linear Constrained MPC: Real-Time Implementation of Greenhouse Air Temperature Control", Computers and Electronics in Agriculture 49 (2005), pp. 345-356, www.elsevier.com/locate/compag, doi:10.1016/j.compag.2005.08.005.

Mehmet Esen, et al., "Experimental Evaluation of Using Various Renewable Energy Sources for Heating a Greenhouse", Energy and Buildings 65 (2013), pp. 340-351, journal homepage: www.elsevier.com/locate/enbuild, http://dx.doi.org/10.1016/j.enbuild.2013.06.018.

M. K. Ghosal, et al., "Mathematical Modeling for Greenhouse heating by Using Thermal Curtain and Geothermal Energy", Solar Energy 76 (2004), pp. 603-613, Centre for Energy Studies, Indian Institute of Technology, Hauz Khas, New Delhi 110016, India, www.elsevier.com/locate/solener, doi:10.1016/j.solener.2003.12.004.

Richard G. Snyder, "Greenhouse Tomato Handbook", Mississippi State University, Published 1828 (POD-06-19), 36 pages.

J.K. Gruber, et al., "Nonlinear MPC Based on a Volterra Series Model for Greenhouse Temperature Control Using Natural Ventilation", Control Engineering Practice 19 (2011), pp. 354-366, journal homepage: www.elsevier.com/locate/conengprac, doi:10.1016/j.conengprac.2010.12.004.

David G. Hart, "Using AMI to Realize the Smart Grid", IEEE, 2 pages, 2008.

Akhtar Hussain, et al., "Optimal Operation of Greenhouses in Microgrids Perspective", http://www.ieee.org/publications_standards/publications/rights/index.html, DOI: 10.1109/TSG.2018.2828942, IEEE Transactions on Smart Grid, 2018, 11 pages.

Denia Kolokotsa, "Development of Simulation Algorithms for Control Scheme Optimization in Greenhouses", Jan. 2005 ResearchGate, 8 pages, https://www.researchgate.net/publication/228943721, Technological Educational Institute of Crete, Department of Natural Resources and Environment, 73133 Chania, Crete, Greece.

B. Marchi, et al., "Industrial Symbiosis for Greener Horticulture Practices: the CO2 Enrichment from Energy Intensive Industrial Processes", ScienceDirect, Procedia CIRP 69 (2018), pp. 562-567, www.elsevier.com/locate/procedia, doi:10.1016/j.procir.2017.11.117.

A. Mehrizi-Sani, "Distributed Control Techniques in Microgrids", Microgrid, Chapter 2, 2017, Washington State University, Pullman, WA, http://dx.doi.org/10.1016/B978-0-08-101753-1.00002-4, 20 pages.

Tae Won Moon, et al. "Estimation of Greenhouse CO2 concentration Via an Artificial Neural Network That Uses Environmental Factors", Horticulture, Environment, and Biotechnology (2018) 59:45-50, https://doi.org/10.1007/s13580-018-0015-1, 6 pages, CrossMark Research Report 2017, Korean Society for horticultural Science and Springer-Verlag GmbH Germany, part of Springer Nature 2018.

J.C. Moreno, et al., "Robust Control of Greenhouse Climate Exploiting Measurable Disturbances", 15th Triennial World Congress, Barcelona, Spain, 2002, Universidad de Almeria, Spain, www.elsevier.com/locate/ifac, 6 pages.

Liev M. Mortensen, "Review: CO2 Enrichment in Greenhouses. Crop Responses", Scientia Horticulturae, 33 (1987), pp. 1-25, Elsevier Science Publishers B.V., Amsterdam—printed in The Netherlands.

Subhas Chandra Mukhopadhyay, "Smart Sensing Technology for Agriculture and Environmental Monitoring", Lecture Notes in Elecliical Engineering, vol. 146, 392 pages, 2012, FIEEE, Massey University (Turitea Campus), School of Engineering and Advanced Technology, Palmerston North New Zealand.

Sujata Nayak, et al., "Energy and Exergy Analysis of Photovoltaic/Thermal Integrated With a Solar Greenhouse", Energy and Buildings 40 (2008), pp. 2015-2021, Centre for Energy Studies, Indican

(56) References Cited

OTHER PUBLICATIONS

Institute of Technology, Delhi, Hauz Khas, New Delhi 10016, India, journal homepage:www.elsevier.com/locate/enbuild, doi:10.1016/j.enbuild.2008.05.007.

Marius Ovidiu Neamtu, et al., "A Geothermal Generator for Grid Greenhouse, Electrical Power Generator for Supplying Microgrid", 2015 International Conference on Electrical Drives and Power Electronics (EDPE), The High Tatras, Sep. 21-23, 2015, 4 pages.

Mohammad Chehreghani Bozchalui, "Optimal Operation of Energy Hubs in the Context of Smart Grids", a thesis presented to the University of Waterloo, Waterloo, Ontario, Canada, 2011, 224 pages.

J. Boaventura Cunha, et al., "A Greenhouse Climate Multivariable Predictive Controller", International Society for Horticultural Science, Sep. 22, 2020, 8 pages, https://doi.org/10.17660/ActaHortic.2000.534.31.

Sonja Vermeulen, et al., "Climate Change, Agriculture and Food Security: a Global Partnership to Link Research and Action for Low-Income Agricultural Producers and Consumers", SciVerse ScienceDirect, www.sciencedirect.com, Current Opinion in Environmental Sustainability 2012, 4:128-133, 6 pages, DOI 10.1016/j.cosust.2011.12.004.

\* cited by examiner

US 11,684,025 B2

CENTRALIZED PREDICTIVE CONTROLLER FOR MANAGEMENT AND OPTIMAL OPERATION OF MICROGRID POWERED GREENHOUSES

FIELD

Some example embodiments may generally relate to a centralized predictive controller, and specifically, a centralized predictive controller for management and optimal operation of microgrid-powered greenhouses.

BACKGROUND

A greenhouse may be a structure that is used to regulate climatic conditions for growing plants. Such climatic conditions may include ventilation, heating and cooling, lighting, carbon dioxide enrichment, and/or the like.

SUMMARY

According to a first embodiment, a method may include initiating, by a device, a state of a greenhouse. The method may include acquiring new environmental data from one or more sensors after initiating the state of the greenhouse. The method may include updating one or more model predictions based on the acquired data. The method may include computing a predicted renewable power generation of one or more renewable energy sources after updating the one or more model predictions. The method may include performing an optimization calculation based on the one or more model predictions or the predicted renewable power generation. The method may include generating a control signal based on the optimization calculation. The control signal may be to control one or more systems associated with the greenhouse. The one or more systems may be associated with controlling environmental conditions within the greenhouse.

In a variant, the state may be of at least one of: an energy storage unit, a water reservoir, a renewable energy power generation, an inside temperature of the greenhouse, a carbon-dioxide level within the greenhouse, a lighting load within the greenhouse, or an angle of an opening of a vent of the greenhouse. In a variant, initiating the state of the greenhouse may further comprise utilizing a state equation related to computing a state of at least one of: photovoltaic power generation, power generated by a wind turbine generator, a charge of an energy storage unit, a total power consumed by artificial lighting, carbon-dioxide injection, dehumidification, fogging, a total power consumed by one or more pumping stations, a total power purchased from a distributed network operator, or a total power sold to the distributed network operator.

In a variant, the method may further include initiating a timer or a counter prior to acquiring the new environmental data. The timer or the counter may be associated with controlling a quantity of times that the device performs the acquiring the new environmental data, the updating the one or more model predictions, the computing the predicted renewable power generation, the performing the optimization, or the generating the control signal. In a variant, the method may further include determining whether the timer or the counter indicates that the quantity of times that the device performs the acquiring the new environmental data, the updating the one or more model predictions, the computing the predicted renewable power generation, the performing the optimization, or the generating the control signal has satisfied a threshold. In a variant, the method may further include either: performing the acquiring the new environmental data, the updating the one or more model predictions, the computing the predicted renewable power generation, the performing the optimization calculation, or the generating the control signal for an additional time, or terminating further operations.

In a variant, the one or more sensors may include at least one of: one or more internal environmental sensors that monitor an internal environment of the greenhouse, or one or more external environmental sensors that monitor an external environment of the greenhouse. In a variant, the one or more systems may comprise at least one of, a heating or cooling system, an artificial lighting system, a fogging system, or a carbon-dioxide injector system.

In a variant, updating the model predictions may include predicting external environmental conditions of the greenhouse or internal environmental conditions of the greenhouse based on the data. In a variant, the renewable power generation may be associated with one or more photovoltaic panels or one or more wind turbine generators. In a variant, performing the optimization calculation may include performing the optimization calculation utilizing an objective function. In a variant, the objective function may include one or more quadratic errors between one or more manipulated variables and reference trajectory signals. In a variant, the method may include performing the acquiring the new environmental data, the updating the one or more model predictions, the computing the predicted renewable power generation, the performing the optimization calculation, and the generating the control signal for a threshold amount of time or a threshold quantity of iterations.

A second embodiment may be directed to an apparatus including at least one processor and at least one memory comprising computer program code. The at least one memory and computer program code may be configured, with the at least one processor, to cause the apparatus at least to perform the method according to the first embodiment, or any of the variants discussed above.

A third embodiment may be directed to an apparatus that may include circuitry configured to perform the method according to the first embodiment, or any of the variants discussed above.

A fourth embodiment may be directed to an apparatus that may include means for performing the method according to the first embodiment, or any of the variants discussed above. Examples of the means may include one or more processors, memory, and/or computer program codes for causing the performance of the operation.

A fifth embodiment may be directed to a computer readable medium comprising program instructions stored thereon for performing at least the method according to the first embodiment, or any of the variants discussed above.

A sixth embodiment may be directed to a computer program product encoding instructions for performing at least the method according to the first embodiment, or any of the variants discussed above.

BRIEF DESCRIPTION OF THE DRAWINGS

For proper understanding of example embodiments, reference should be made to the accompanying drawings, wherein.

DETAILED DESCRIPTION

Figure 1:
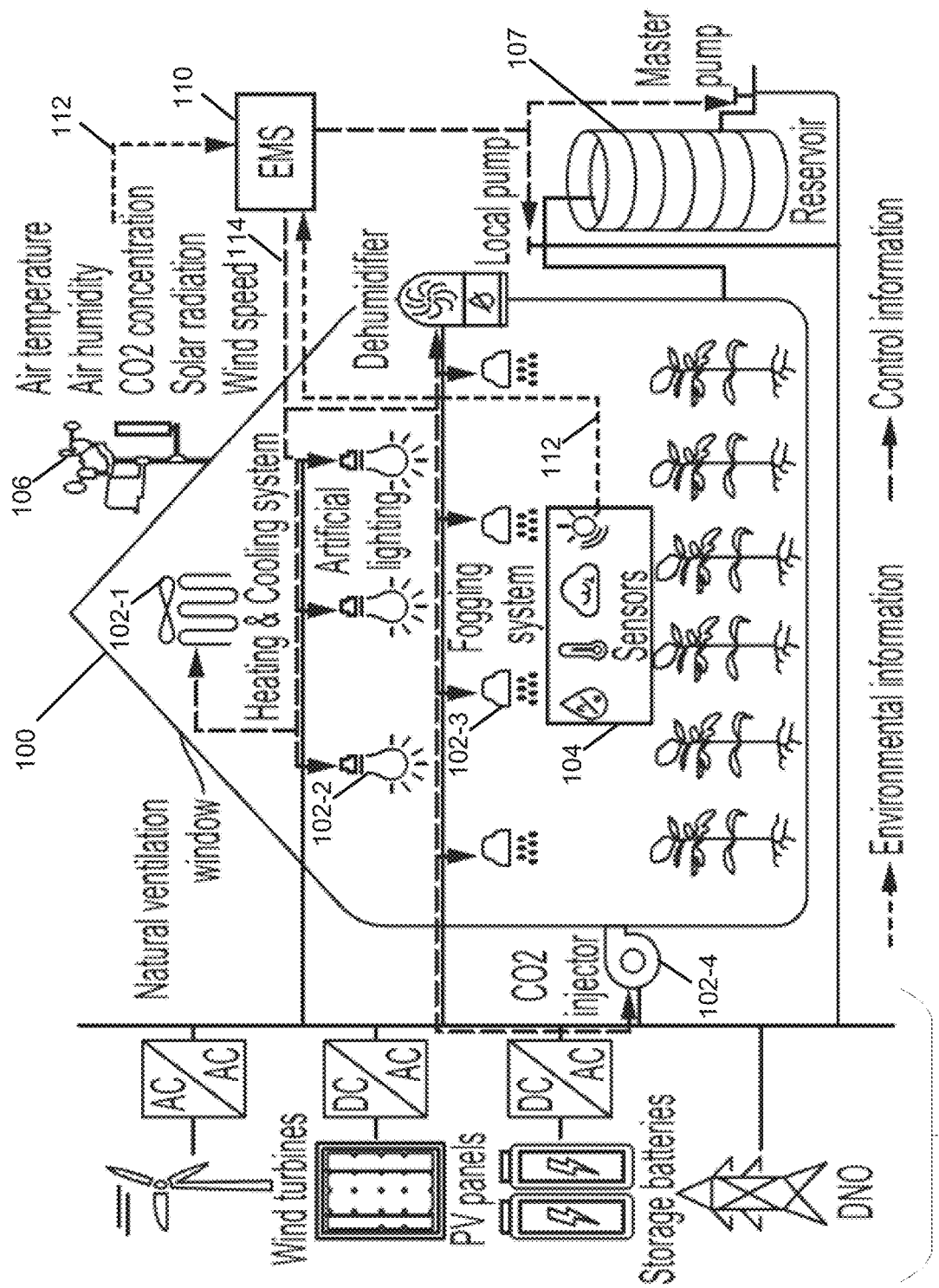
FIG. 1 illustrates an example of a microgrid-powered greenhouse architecture that includes a centralized predictive controller for management and optimal operation of the greenhouse, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for centralized predictive controller for management and optimal operation of microgrid-powered greenhouses is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

With the threats of climate change, human population growth, and scarcity of available water and arable land, the agriculture sector is facing challenges in ensuring food security. Thus, shifting from traditional farming systems to sustainable intensification of agriculture favoring greenhouse crops as a means of productivity gains may be needed. Greenhouses have opened a new perspective in the agricultural sector by offering economical land use, as well as carrying out energy and water savings. They are used in floriculture and horticulture to extend cultural seasons, to protect plants from adverse environmental conditions, such as extreme temperatures, wind, hail and rain, and/or to screen out plant pests and diseases. One goal of a greenhouse may include controlling the indoor environment of the greenhouse to promote the quality, quantity, and growth of a crop. However, their indoor environment intelligent monitoring can be a complex procedure because of the number of involved variables and the dependence of these variables on each other. The appropriate management of the indoor climatic conditions can be highly influenced, in addition to the external environmental conditions, by other parameters including the indoor temperature, the relative humidity, the carbon-dioxide ($CO_2$) concentration, and/or the indoor light intensity. These variables may have to be optimally controlled within acceptable limits.

To meet the desired needs, several control strategies have been discussed with respect to various techniques, such as fuzzy logic controllers and proportional integrative derivative distributed controllers using genetic algorithms that represent useful tools compared to traditional control techniques. Robust control has also been used with respect to greenhouse temperature and hygrometry control, despite the high interaction between the process variables and the external meteorological conditions. Furthermore, a Bayesian network has been used for approximation of a control signal based on predefined set points, as well as on the environmental conditions.

However, the above-mentioned techniques have focused on improving the greenhouse internal climate without considering energy concerns. For instance, the high energy consumption of greenhouses can be a factor in hindering further development of environmental controls of greenhouses. To reduce the dependence on constrained production of unsustainable energy, the integration of different renewable energy sources (RES) has led to the concept of microgrids. Microgrids can be considered as portions of a power distribution network that includes loads, distributed generations, and energy storage devices, grouped together within a limited geographic area. They can deliver added value due to their ability to integrate renewable energies in a grid-connected mode, along with their ability to continue operating in isolated (non-grid-connected) modes without disruption to the main network or to the microgrid itself. In a grid-connected configuration, the microgrid may be connected to the distribution network operator (DNO), which may provide mutual benefits in selling/purchasing power. In an isolated mode, the microgrid may have to achieve renewable energy autonomy through an energy storage unit to ensure the stability of the network and the continuity of the service.

The implementation of microgrids in the agricultural sector may correspond to the needs of enhancing the quality and security of energy supply and of increasing RES autonomy in rural areas. These agricultural microgrids can produce local socio-economic and environmental benefits. Besides, they can offer an interesting opportunity in promoting green development, while ensuring the reliability, flexibility, efficiency, and environmentally friendly communication capabilities, stimulating the modernization of the agricultural sector. Their main goal may be to assist in balancing the power generation and the power consumption using sensors, communications, and monitoring technologies. Particularly, greenhouses can be considered as microgrids because of the availability of distributed energy resources and different load types. Thus, they can work in grid connected configuration injecting/extracting electricity excesses/needs into/from the network. Even the grid disconnected configuration can maximize the local resources. With the integration of advanced data processing and smart metering technologies, farmers can have access to management systems that help in supervising their energy needs while automatically controlling the greenhouse indoor microclimate.

From the energy management viewpoint, many techniques may have been proposed for the optimal handling of energy consumption during the operation of greenhouses. Commonly, the existing methods fail to globally optimize the energy utilization due to a lack of general optimization scheme that considers the stochasticity of weather conditions, the intermittent behavior of RES, and the storage dynamics, which can be a dynamic way for more efficient real-time control. Previous approaches have focused on a partial control of the greenhouse operation neglecting the global optimal management related to the optimal environment, the parameters correlation, the energy consumption, and the efficient control. However, microgrids may achieve high performance through the deployment of advanced control algorithms based on predicted future conditions, the optimal use of storage devices, and the implementation of optimal-based, instead of heuristic-based, approaches. Also, from the control point of view, model predictive control (MPC) has been suggested by the power system community as it offers many advantages, such as being based on the system predictions, as well as providing feedback mechanisms that handle uncertainties and constraints, which may be attractive for systems dependent on renewable energy forecasts.

In regards to greenhouse energy management systems, several control techniques have been attempted to minimize the energy required for the microclimate regulation. Within this scope, some techniques have focused on integrating renewable energy sources to reduce the cost for an economical crop growth by providing a sustainable way to obtain greenhouse energy supply. The technologies used in this context are often photovoltaic (PV) modules, geothermal systems, hybrid photovoltaic/thermal solar collectors, or a combination of these. However, from a different aspect, other techniques have focused on the control optimization based on mathematical models for optimal greenhouse cultivation practices.

Some of these approaches may be deterministic and may not integrate the randomness of the weather conditions, which may be effective in dealing with data uncertainty in optimal operations. Weather forecast tools may be used by greenhouse growers because of their potential to reduce energy demand. For example, they may allow, in combination with the greenhouse energy consumption prediction model, to solve the load modeling problem in smart grid applications. Although, under the micro grid paradigm, some techniques have attempted to optimize the greenhouse energy utilization, taking into account the weather conditions by considering forecasting results. Their objective was to minimize the total energy costs and demand charges via a hierarchical model, but without integrating RES. Some techniques have proposed a greenhouse optimal energy management strategy for both grid-connected and isolated modes based on robust optimization. Some techniques have attempted use of a stochastic multi-timescale energy management scheme of greenhouses with renewable energy sources.

As can be understood from this description, appropriate management of environmental conditions may be a fundamental problem for greenhouse cultivation and may have to be achieved through advanced control strategies. Some embodiments described herein may provide for a greenhouse indoor environment controller based on model predictive control (MPC), which can be integrated into existing greenhouse regulatory systems to optimally maintain climatic variables, including artificial lighting levels, and/or $CO_2$, indoor temperature, and humidity levels within acceptable limits. The objectives of the MPC may include maximizing the rate of crop photosynthesis while optimizing the use of the available water and energy resources, taking into account the unpredictability and intermittent nature of renewable energies and external atmospheric conditions. This may facilitate the management of greenhouses by anticipating control actions for a better quality of production. For that, the mathematical formulation of the optimal control problem may be described herein, and the numerical results related to the application of the MPC to a case study may be described, integrating the effects of greenhouse structural considerations and the influence of climate data on its operation.

Certain embodiments may pool different active systems that make up the greenhouse in order to deploy control means for an overall optimization of greenhouse operation (e.g., in the context of microgrids). The greenhouse may be connected to both photovoltaic panels and wind turbine generators, and to the distributed network operator. Certain embodiments may include use of an energy storage unit and/or a water reservoir. In this way, certain embodiments may provide for installing a unit for the production and storage of green electricity, such as to integrate certain embodiments into a sustainable development approach, using clean energy. In addition, certain embodiments may integrate the data acquisition via a wireless sensor network (WSN) and the global control via a centralized model predictive controller. The model can be implemented as a supervisory real-time control in the existing greenhouse energy management systems, to effectively manage their overall energy and water demand, production and storage, and/or the like, such as to track optimal levels of the greenhouse environment parameters.

To develop an innovative greenhouse environment control scheme that manipulates the parameters affecting the crop growth (e.g., indoor temperature, relative humidity, CO2 rate, lighting levels, and natural ventilation), while optimizing the energy and water consumptions, taking into account the uncertainty of the external atmospheric conditions and the intermittent nature of renewable energy sources and water needs. Thus, certain embodiments may provide a centralized model predictive controller that considers various operational requirements and constraints. The centralization of operations may balance electricity production, by preventing overproduction and under production, and may protect against overloads. In this way, certain embodiments may provide a renewable energy system that reinforces production in a sustainable agriculture approach that conserves natural resources.

FIG. 1 illustrates an example of a microgrid-powered greenhouse 100 architecture that includes a centralized predictive controller for management and optimal operation of the greenhouse 100, according to some embodiments. For example, the greenhouse 100 may include various environmental control systems 102 (e.g., a heating and cooling system 102-1, an artificial lighting system 102-2, a fogging system 102-3, and a $CO_2$ injector 102-4), various indoor sensors 104 for detecting indoor environmental conditions within the greenhouse 100 (e.g., a humidity sensor, a temperature sensor, a light sensor, and/or the like), and/or various external environment sensors 106 for detecting environmental conditions external to the greenhouse 100 (e.g., an air temperature sensor, an air humidity sensor, a $CO_2$ concentration sensor, a solar radiation sensor, a wind speed sensor, and/or the like). The greenhouse 100 may be connected to a water pump and/or reservoir system 107 that includes a water pump to the greenhouse 100, a master pump, and/or a water reservoir. The greenhouse 100 may be connected to an electricity supply network 108 (e.g., that includes wind turbines, PV panels, storage batteries (as energy storage units), a DNO, power converters (AC/AC or DC/AC converters), and/or the like. The greenhouse 100 may be a microgrid that is connected to the DNO through electronic converters to reduce instability due to the intermittent nature of power generation and load demand. The PV panels and/or the wind turbines may represent renewable energy sources. Thermal, electrical, and water loads representing actuating devices demand, such as the fogging system, the dehumidifier, the CO2 injector, the artificial lighting system, the pumps, and the heating and cooling system, may be present with the example illustrated in FIG. 1.

As further illustrated, the greenhouse 100 (or various systems 102 and/or sensors 104, 106) may be connected to an energy management system (EMS) 110, which may optimize the production performance of the greenhouse 100. The EMS 110 may be connected to a data acquisition system (not shown in FIG. 1) that collects data from the sensors 104, 106.

The EMS 110 may optimize autonomous greenhouse operation. As illustrated at 112, the EMS 110 may collect data from the different sensors 104, 106 available on-site to predict, with an interval (e.g., of 10 minutes), information related to the outdoor environment of the greenhouse 100, including temperature, humidity, $CO_2$, wind speed, and solar radiance. These forecasts may be first used by the EMS 110 to determine the predicted quantity of power generated from photovoltaic panels and wind turbine generators.

In certain embodiments, the EMS 110 may implement rules for the predicted quantities (e.g., for a greenhouse 100, when the EMS 110 operates as a master central controller (MCC), and/or the like). Additionally, or alternatively, the EMS 110 may send the predicted quantities to a main controller (e.g., a MCC via a supervisory master unit (SMU), described below, in cases where the EMS 110 is a local controller), where the rules are implemented. The EMS 110 may generate set points control signals for the existing actuators considering optimal ranges and control parameter constraints and/or based on the predicted quantities. For example, the EMS 110 may generate control signals that optimally distribute the renewable power to the greenhouse loads while reducing fluctuations by selling the remaining surplus power to the network or storing it in the batteries as a replacement. As illustrated at 114, the EMS 110 may transmit the control signals to the systems 102 to control internal environmental conditions in the greenhouse 100, to other components to cause surplus power to be provided to the electricity supply network 108, and/or the like. In this way, indoor conditions of a greenhouse 100 may be controlled to improve cultivation, while reducing waste of electricity or other resources, such as water or $CO_2$, thereby improving operations of a greenhouse 100.

As described above, FIG. 1 is provided as an example. Other examples are possible, according to some embodiments.

Figure 2:
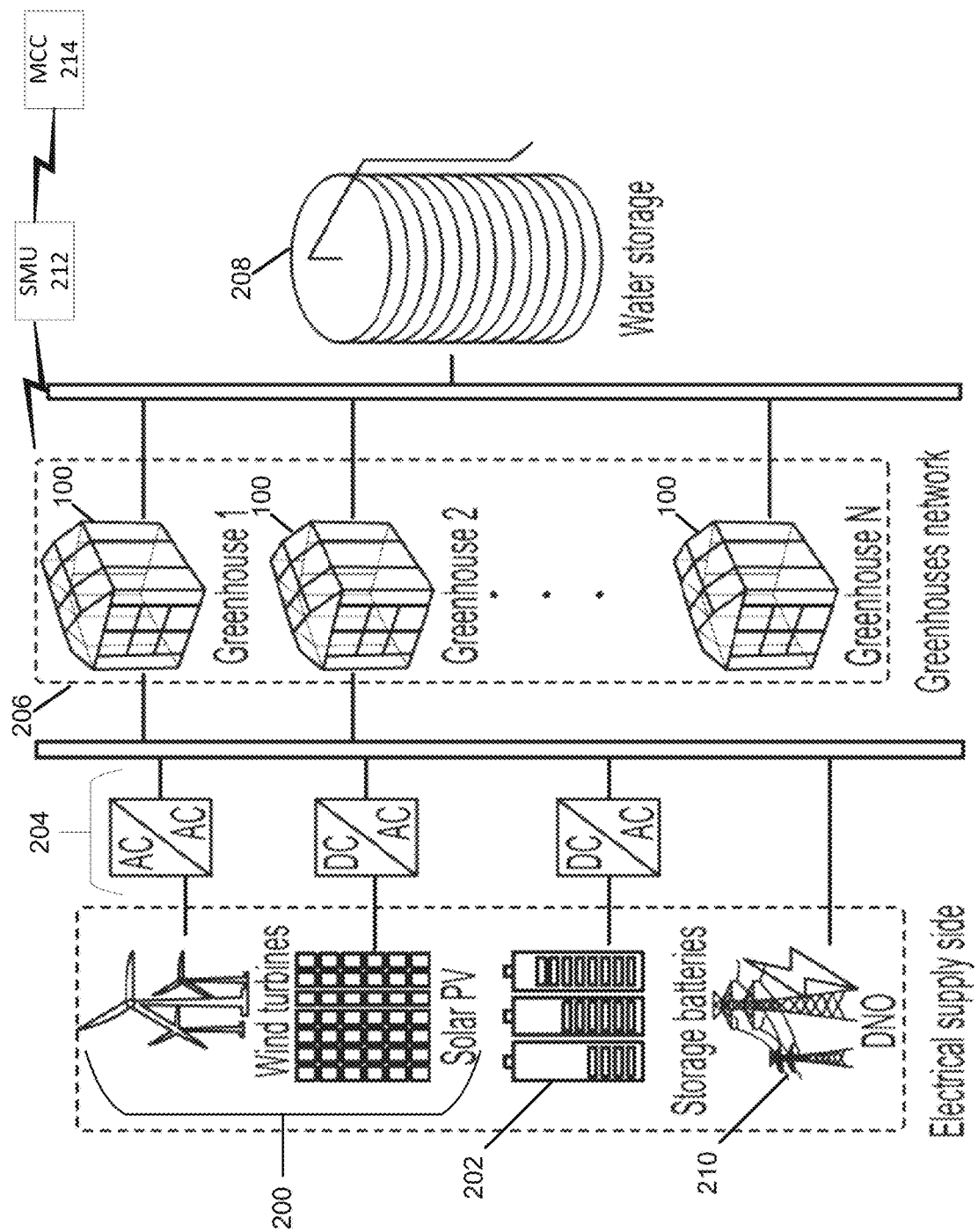
FIG. 2 illustrates an example of a smart network of greenhouses integrated microgrid (NGIM), according to some embodiments.

FIG. 2 illustrates an example of a NGIM, according to some embodiments. For example, the NGIM may form a small power grind. The NGIM may include renewable energy generators 200 (e.g., illustrated as solar PV panels and wind turbines), an energy storage system (ESS) 202 (e.g., illustrated as batteries), and power converters 204 (e.g., illustrated as AC/AC or DC/AC converters). The energy generators 200, the ESS 202, and the power converters 204 may be included in an electrical supply network ("electrical supply side"), which may be similar to electrical supply network 108 described above. The NGIM may include a network of greenhouses 206 (e.g., that includes greenhouses 100-1 through 100-N, where each greenhouse 100 may include one or more components of the greenhouse 100), and pumps and/or water storage 208. In addition, the NGIM may include a distributed network operator (DNO) 210 that provides bidirectional power exchanges.

Certain embodiments described herein may provide a centralized controller that can be used to control environmental conditions at each of the greenhouses 100 of the NGIM. For example, each greenhouse 100 may be associated with an EMS 110 and the EMSs 110 may be connected to an MCC 214 via a SMU 212. Continuing with the previous example, the EMS 110 may function as a master central controller to control operation of each of the greenhouses 100-1 through 100-N (e.g., where the SMU 212 functions as an interface between the MCC 214 and the EMSs 110 operating as local controllers at each of the greenhouses 100-1 through 100-N). Alternatively, the EMS 110, the SMU 212, and the MCC 214 may be integrated into a single device that performs the operations of all three of these devices (e.g., the integrated device may be a local device at each greenhouse 100, or may be a centralized device that is directly connected to greenhouses 100-1 through 100-N.

As indicated above, FIG. 2 is provided as an example. Other examples are possible, according to some embodiments.

Figure 3:
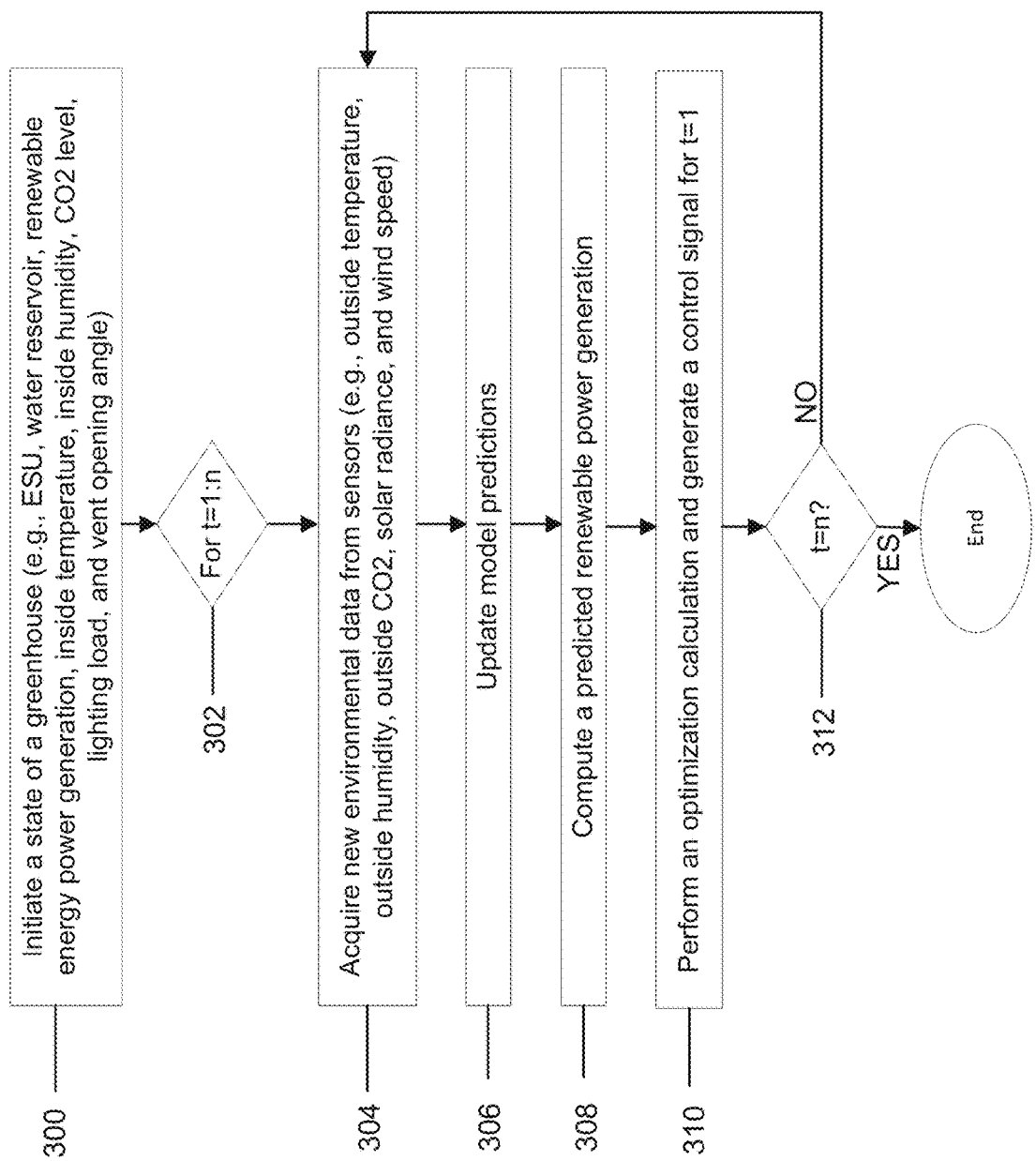
FIG. 3 illustrates an example flow chart of a process, according to some embodiments.

FIG. 3 illustrates an example flow diagram of a method, according to some embodiments. For example, FIG. 3 shows example operations of a EMS 110 (e.g., apparatus 10). Some of the operations illustrated in FIG. 3 may be similar to some operations shown in, and described with respect to, FIGS. 1-2 and 4-15.

Certain embodiments may utilize predictive control, which may be based on the use of a dynamic model of a process in the EMS 100 in real time in order to anticipate future behaviors. For example, at a time step, the EMS 100 may compute predictions of the controlled variables up to a time horizon (Np), to determine the future control sequence for each power flow. This may be performed to reach desired set points by following a reference trajectory. An element of the calculated control may be applied at the next clock stroke. As described below, these steps may be repeated utilizing a receding horizon principle (e.g., at the next time step new power and load data may be available, allowing the EMS 100 to compute a new control sequence). One advantage of this approach may be its ability to anticipate future events while providing a clear constraints management. This MPC method is depicted in FIG. 3.

In an embodiment, the method may include, at 300, initiating a state of a greenhouse. For example, the EMS 110 may initiate a state of a greenhouse 110. The state of the greenhouse 110 may include, for example, a state of the energy storage unit (ESU), the water reservoir, the renewable energy power generation, the inside temperature, the inside humidity, the $CO_2$ level, the lighting load, the vent opening angle of a vent to an exterior of the greenhouse 100, and/or the like.

Certain embodiments described herein may utilize various state equations in connection with the operations illustrated at 300. For example, the state equations may be associated with PV power generation, power generated by a wind turbine generator, a state of charge of the ESU, a total power consumed by artificial lighting, CO2 injection, dehumidification, fogging, total power consumed by pumping station(s), total power purchased from a DNO, and/or total power sold to a DNO. The state equations that may be utilized in connection with certain embodiments are described elsewhere herein.

The method may include, at 302, performing certain following operations for time periods (or iterations) (t) 1 to n. For example, the EMS 110 may set a timer and/or a counter to measure an amount of time (or number of iterations) of a certain operations described herein. The EMS 110 may perform the operations for a threshold amount of time (e.g., time 1 to n) or a certain number of iterations (e.g., iterations 1 to n).

The method may include at 304, acquiring new environmental data from sensors. For example, the EMS 110 may acquire new environmental data from sensors 106, similar to that described above at 112. The sensors 106 may measure an outside temperature of a greenhouse 100, an outside humidity of a greenhouse 100, an outside $CO_2$ level of the greenhouse 100, a solar radiance of a greenhouse 100, and/or a wind speed of a greenhouse 100. Additionally, or alternatively, the EMS 110 may obtain data from sensors 104 related to internal environmental conditions of a greenhouse 110. The EMS 110 may acquire the data periodically, according to a schedule, and/or the like.

The method may include, at 306, updating model predictions. For example, the EMS 110, based on the acquired data, may predict external and/or internal environmental conditions for a greenhouse 100, plant growth of plants within the greenhouse 100, and/or the like. The manner in which certain embodiments update model predictions is described elsewhere herein.

The method may include, at 308, computing a predicted renewable power generation. For example, the EMS 110 may compute a predicted renewable power generation of renewable energy sources (e.g., PV panels and/or wind turbines) included in the electricity supply network 108. The manner in which the EMS 110 may compute the predicted renewable power generation is described elsewhere herein.

The method may include, at 310, performing an optimization calculation and generating a control signal for t=1. For example, the EMS 110 may perform an optimization calculation that optimizes minimization of the purchased energy from the DNO, and minimization of deviations from the reference trajectory signals representing the optimal greenhouse environment data as well as the optimal energy and water storage levels, as described elsewhere herein. In addition to performing the optimization, the EMS 110 may generate a control signal for t=1. For example, the control signal may control one or more of the systems 102 to control internal environmental conditions of the greenhouse 100.

The method may include, at 312, determining whether t=n. For example, the EMS 110 may determine whether t=n. If the EMS 110 determines that t=n (312—YES), then the method may end. Alternatively, if the EMS 110 determines that t does not equal n (312—NO), then the method may return to operation 304. For example, after generating the control signal at t=1, the method may return to 304 and the EMS 110 may perform operations 304 through 310, resulting in generation of a control signal at t=2. When the method returns to 304, the EMS 110 may iterate a timer or a counter. Performance of the optimization and/or generation of the control signal is described elsewhere herein.

As described above, FIG. 3 is provided as an example. Other examples are possible according to some embodiments.

The following provides further description of some embodiments of certain operations described herein. In a greenhouse 100, the efficiency of plant production may be determined by the adjustment of certain climate growth conditions. These factors, for the quality and productivity of plant growth, may include air temperature, relative humidity, light intensity, and/or $CO_2$ rate. To achieve good quality and high production at low expense, these environmental variables may have to be optimally controlled through heating, supplementary lighting, CO2 enrichment by injection, humidifying/dehumidifying, and/or air ventilation. To do so, certain embodiments may utilize an objective function in connection with certain operations described herein, such as the operations at 310.

The main objective may include minimizing the purchased energy from the DNO, and minimizing deviations from the reference trajectory signals representing the optimal greenhouse environment data as well as the optimal energy and water storage levels. This may help to ensure safety and a good service quality. For this, the objective function may include quadratic errors between the manipulated variables and reference trajectory signals. The objective function may be represented by equation (1):

$$J = u_{edn} + \sum_{t=1}^{T} \left(\Phi_{in}(t+k) - \overline{\Phi_{in}(t+k)}\right)^2 \tag{1}$$

$$+ \sum_{t=1}^{T} \left(RH^{in}(t+k) - \overline{RH^{in}(t+k)}\right)^2$$

$$+ \sum_{t=1}^{T} \left(CO_2^{in}(t+k) - \overline{CO_2^{in}(t+k)}\right)^2$$

$$+ \sum_{t=1}^{T} \left(u_{al}(t+k) - \overline{u_{al}(t+k)}\right)^2$$

$$+ \sum_{t=1}^{T} \left(F_{gh}(t+k) - \overline{F_{gh}(t+k)}\right)^2$$

$$- \sum_{t=1}^{T} \left(E_{st}(t+k) - \overline{E_{st}(t+k)}\right)^2$$

$$- \sum_{t=1}^{T} \left(r(t+k) - \overline{r(t+k)}\right)^2$$

Certain embodiments described herein may utilize dynamic model constraints, such as photovoltaic (PV) power generation, wind turbine power output, energy storage unit, a pumping station and/or water storage system, a temperature control system, a humidity control system, a CO2 injector system, air circulation control, and an artificial lighting system. For example, these model constraints may be utilized in connection with operation 310.

With respect to PV power generation, photovoltaic production may depend on the solar radiation of the site on which the panels are installed, in addition to the technical characteristics of the panel itself. The optimum voltage $V_{pv}$ and current $I_{pv}$ generated may be represented by equations (2) and (3):

$$I_{pv}(t) = I_{sc}\left\{1 - \alpha\left[\exp\left(\frac{V_{mp}}{\beta V_{oc}}\right) - 1\right]\right\} + \Delta I(t) \tag{2}$$

$$V_{pv}(t) = V_{mp}\left[1 + 0.0539\log\left(\frac{I(t)}{I_{st}}\right)\right] + \mu\Delta T(t) \tag{3}$$

where, $$\alpha = \left(1 - \frac{I_{mp}}{I_{sc}}\right)\exp\left[-\frac{V_{mp}}{BV_{oc}}\right] \tag{4}$$

$$\beta = \frac{\frac{V_{mp}}{V_{oc}} - 1}{\ln\left(1 - \frac{I_{mp}}{I_{sc}}\right)} \tag{5}$$

$$\Delta I(t) = \gamma\left(\frac{I(t)}{I_{st}}\right)\Delta T(t) + \left(\frac{I(t)}{I_{st}} - 1\right)I_{sc} \tag{6}$$

$$\Delta T(t) = T_{amb} + 0.02I(t) \tag{7}$$

The PV power generation may be represented by equation (8):

$$u_{pv}(t) = \eta_{pv,s}\eta_{pv,p}V_{pv}(t)I_{pv}(t)\eta_{loss} \tag{8}$$

The power output of the PV module may be limited between upper and lower bounds:

$$u_{pv,min} < u_{pv}(t) < u_{pv,max} \tag{9}$$

With respect to wind turbine power output, the wind turbine may derive its energy from the kinetic energy of the wind, which may depend on its speed. A wind turbine's power output may be provided from a linear model:

$$u_w = \begin{cases} 0 & v_{wind}(t) < v_c \\ P_w(A_w + B_w v_{wind}(t))v_c \leq v_{wind}(t) \leq v_r \\ P_w v_r \leq v_{wind}(t) \leq v_f \\ 0 & v_{wind}(t) > v_f \end{cases} \tag{10}$$

with $$\begin{cases} A_w = \dfrac{v_c}{v_c - v_r} \\ B_w = \dfrac{1}{v_r - v_c} \end{cases} \tag{11}$$

The wind turbine power output may be limited between upper and lower bounds:

$$u_{w,min} < u_w(t) < u_{w,max} \tag{12}$$

The greenhouse 100 may be equipped with an energy storage unit (batteries) whose function may be to balance the electric loads and renewable energy power generation. The ESU may be modeled as an energy reservoir with a certain degree of performance and upper and lower storage bounds. Its characteristics may be represented by:

$$E_{st}(t+\Delta t) = E_{st}(t) + \eta_{Char}u_{Char}(t)\Delta t - \eta_{Dis}u_{Dis}(t)\Delta t \tag{13}$$

The energy stored may satisfy the ESU capacity limits:

$$E_{st,min} < E_{st}(t+\Delta t) < E_{st,max} \tag{14}$$

$$u_{Char,min} < u_{Char}(t+\Delta t) < u_{Char,max} \tag{15}$$

$$u_{Dis,min} < u_{Dis}(t+\Delta t) < u_{Dis,max} \tag{16}$$

Charging and discharging may not operate simultaneously:

$$u_{Char}(t+\Delta t)*u_{Dis}(t+\Delta t) = 0 \tag{17}$$

The greenhouse 100 may be equipped with a water storage system (reservoir) used to provide water supply. It may be represented by:

$$r(t+\Delta t) = r(t) + [F_s(t) - F_{gh}(t)] \tag{18}$$

where the water flows may be related to the electrical energy consumed by the pumping stations as follows:

$$F_s(t) = \frac{u_{p1}(t)*\Delta t}{3600\rho g d_s}\eta_s \tag{19}$$

$$F_{gh}(t) = \frac{u_{p2}(t)*\Delta t}{3600\rho g d_{gh}}\eta_{gh} \tag{20}$$

The water flows and the water stored in the reservoir may satisfy upper and lower limits:

$$r_{min} < r(t+\Delta t) < r_{max} \tag{21}$$

$$\alpha_{sp}(t+k)F_{s,min} \leq F_s(t+k) \leq \alpha_{sp}(t+k)F_{s,max} \tag{22}$$

$$\alpha_{pgh}(t+k)F_{gh,min} \leq F_{gh}(t+k) \leq \alpha_{pgh}(t+k)F_{gh,max} \tag{23}$$

$$\alpha_{sp}(t+k) = \begin{cases} 0 & \text{if } F_s(t+k) \leq F_{s,min} \\ 1 & \text{if } F_s(t+k) \geq F_{s,min} \end{cases} \tag{24}$$

$$\alpha_{pgh}(t+k) = \begin{cases} 0 & \text{if } F_{gh}(t+k) \leq F_{gh,min} \\ 1 & \text{if } F_{gh}(t+k) \geq F_{gh,min} \end{cases} \tag{25}$$

Temperature may be a factor controlling the rate of photosynthesis. At low to moderate temperatures, the interactions activity may increase with increasing temperature in accordance with the Arrhenius relationship. Thus, to avoid the decrease of crop growth, the greenhouse may include a micro-CHP that aims to maintain the indoor temperature at its optimal desired level. It may be represented as:

$$\Phi_{in}(t + \Delta t) = \Phi_{in}(t) e^{\frac{\Delta t}{R_{th} C_{air}}} + (R_{th} u_{heat}^{th}(t) + \Phi_{out}(t))\left(1 - e^{\frac{\Delta t}{R_{th} C_{air}}}\right) \quad (26)$$

where the electric power may be defined as:

$$u_{heat}^{elc}(t) = \frac{\eta_{el}}{\eta_{th}} u_{heat}^{th}(t) \quad (27)$$

Thermal resistance of the greenhouse covering material may be based on the greenhouse geometry, the covering material conductivity, and thickness of the covering material, which may be represented by:

$$R_{th} = \frac{e}{A \cdot k} \quad (28)$$

The inside temperature of the greenhouse 100 may be limited by lower and upper bounds:

$$\Phi_{in,min} \leq \Phi_{in}(t) \leq \Phi_{in,max}$$

The micro-CHP power outputs may be limited by lower and upper bounds:

$$\Phi_{in,min} \leq \Phi_{in}(t) \leq \Phi_{in,max} \quad (29)$$

$$u_{heat,min}^{th}(t+k) \leq u_{heat}^{th}(t+k) \leq u_{heat,max}^{th}(t+k) \quad (30)$$

$$u_{heat,min}^{el}(t+k) \leq u_{heat}^{el}(t+k) \leq u_{heat,max}^{el}(t+k) \quad (31)$$

The micro-CHP power output slope may be represented by:

$$-\frac{\eta_{th}}{\eta_{el}} u_r \leq u_{heat}^{th}(t+k) - u_{heat}^{th}(t+k-1) \leq \frac{\eta_{th}}{\eta_{el}} u_r \quad (32)$$

$$-u_r \leq u_{heat}^{el}(t+k) - u_{heat}^{el}(t+k-1) \leq u_r \quad (33)$$

Relative humidity inside the greenhouse 100 may be considered as a variable affecting the crop growth. The water flow taken in by the roots and evaporated through the leaves into the air for the transpiration process can be affected by the humidity level. The higher the relative humidity, the more slowly transpiration may occur, which may cause tissue damage, growth delays, and/or disease propagation. In addition, low humidity may cause hydria stress and may affect the process of photosynthesis. Therefore, relative humidity inside the greenhouse 100 may have to be supervised to offer an optimal environment for crop growth. The relative humidity may be represented by:

$$RH_{in}(t) = \frac{P_{par}(t)}{P_{sat}(t)} 100\% \quad (34)$$

where both saturated and partial pressures can be represented by:

$$P_{sat}(t) = K_1(-K_2 + K_3 e^{K_4 \Phi_{in}(t)}) \quad (35)$$

$$P_{par}(t) = \frac{w(t) P_{atm}}{K_5} \quad (36)$$

The water content of the indoor air w(t) may be modeled based on the mass balance theory, taking into consideration the moisture ventilated by natural air ventilation and the water quantity added or removed by the fogger or dehumidifier, represented by:

$$w(t + \Delta t) = w(t) + \\ \frac{\Delta t}{\rho_a V} [W_{evp} A + \rho_a A u_{vent}(W_{out}(t) - w(t)) + u_{fog}^{st} W_{fog}^{max} A - u_{deh}^{st} W_{deh}^{max} A] \quad (37)$$

where the outdoor water content $W_{out}(t)$ may be represented by:

$$W_{out}(t) = \frac{K_5 RH_{out}(t) K_1(-K_2 + K_3 e^{C_4 \Phi_{out}(t)})}{P_{atm}} \quad (38)$$

and $$u_{fog}(t) = u_{fog}^{st}(t) * P_{fog} \quad (39)$$

$$u_{deh}(t) = u_{deh}^{st}(t) * P_{deh} \quad (40)$$

The relative humidity inside the greenhouse 100 may be constrained between upper and lower bounds, which may satisfy the following constraints:

$$w(t) \leq RH_{in,max} \frac{P_{sat}(t) K_5}{P_{atm}} \quad (41)$$

$$w(t) \geq RH_{in,min} \frac{P_{sat}(t) K_5}{P_{atm}} \quad (42)$$

Fogging and dehumidification systems may not operate simultaneously, which may be represented by:

$$u_{fog}(t) * u_{deh}(t) = 0 \quad (43)$$

$CO_2$ is one nutrient consumed by plants, and it is absorbed from the air in gaseous form. Its primary effect on plant production is on photosynthesis. $CO_2$ is found normally in the atmosphere at a concentration of approximately 380 parts-per-million (ppm), and photosynthesis may increase rapidly with increasing $CO_2$. Thus, to increase the rate of photosynthesis, the greenhouse may be enriched with additional $CO_2$. The $CO_2$ concentration in the greenhouse 100 may be influenced by the injected $CO_2$, the $CO_2$ consumption by the plants via the photosynthesis process, and/or the exchange with the environment via natural ventilation. The change in indoor $CO_2$ concentration may be represented by:

$$CO_2^{in}(t+\Delta t) = \tag{44}$$
$$CO_2^{in}(t) + \frac{\Delta t}{\rho_a V}\left[K_{inj}^{max}u_{CO2}^{st}(t)A + \rho_a A u_{vent}(t)\left(CO_2^{out}(t) - CO_2^{in}(t+\Delta t)\right) + K_{res}A(K_6 + K_7\Phi_{in}(t)) - \frac{K_{phot}I(t)A}{R_{th}}\right]$$

where $$u_{CO2}(t) = u_{CO2}^{st}(t) * P_{CO2} \tag{45}$$

The concentration of $CO_2$ inside the greenhouse 100 at a time slot may be constrained between upper and lower bounds:

$$CO_2^{in,min}(t) \leq CO_2^{in}(t) \leq CO_2^{in,max(t)} \tag{46}$$

With respect to air circulation control, natural ventilation may have a role in affecting the greenhouse climate. It may be used to maintain a uniform environment throughout the greenhouse 100. The ventilation air flow rate $u_{vent}$ of a greenhouse 100 equipped by roof or side vents may be simulated by combining wind and chimney effects by:

$$u_{vent}(t) = 3600\frac{A_v C_d}{2A}\left[2g\left(\frac{\Phi_{out}^k(t) - \Phi_{in}^k(t)}{\Phi_{out}^k(t)}\right)\left(\frac{H_v}{4}\right) + C_w v_{wind}(t)^2\right]^{0.5} \tag{47}$$

which can be simplified by neglecting the chimney effect, which is generally insignificant for wind speeds greater than 1.5 meters per second (m/s):

$$u_{vent}(t) = 3600\frac{A_v C_d}{2A}C_w^{0.5}v_{wind}(t) \tag{48}$$

The discharge coefficient of the vent opening ($C_d$) and the overall wind effect coefficient ($C_w$) may both be dimensionless coefficients that vary according to the window's opening angle. Therefore, the ventilation air flow rate may be represented by:

$$u_{vent}(t) = 3600\frac{A_v}{A}v_{wind}(t)G(\alpha) \tag{49}$$

where $$G(\alpha) = 2.29 * 10^{-2} * \left(1 - \exp\left(\frac{-\alpha}{21.1}\right)\right) \tag{50}$$

Then, from the ventilation air flow, N can be obtained, which may represent the greenhouse air exchange rate ($h^{-1}$), which may be represented by:

$$N(t) = A * u_{vent}(t)/V \tag{51}$$

The operation of the ventilation may be controlled in the proposed model via the window opening angle, which may be constrained between upper and lower bounds:

$$\alpha_{min} \leq \alpha \leq \alpha_{max} \tag{52}$$

Light may be a parameter for the plant growth. For example, in addition to ambient light, plant development may be affected also by the light intensity, the photoperiod (light/dark period), and the wavelength or spectral distribution. In greenhouse production, artificial lighting may be used during periods with poor natural light conditions to increase crop growth and quality. Certain embodiments may utilize light emitting diodes (LED) due to some technical advantages compared to traditional lighting sources. Flux may be one design consideration for LEDs, which may be represented by:

$$F_{light} = L * A \tag{53}$$

The regulation of the greenhouse artificial lighting loads may be performed according to the incident solar irradiation detected by the WSN, and therefore the total power consumed by the supplementary lighting may be represented by:

$$u_{al}(t) = \begin{cases} F_{light}/\eta_l & \text{if } I(t) < I_{min} \\ 0 & \text{otherwise} \end{cases} \tag{54}$$

The power generated by a photovoltaic system may be represented by:

$$u_{pv}(t+k) = u_{pv,al}(t+k) + u_{pv,CO2}(t+k) + u_{pv,deh}(t+k) + u_{pv,fog}(t+k) + \tag{55}$$
$$u_{pv,p1}(t+k) + u_{pv,p2}(t+k) + u_{pv,esu}(t+k) + u_{pv,edn}(t+k)$$

Certain embodiments may utilize one or more state equations, such as in operation 300. For example, the state equations may output a result that indicates a state of a system, a device, and/or the like described elsewhere herein. The power generated by the wind turbine generator may be represented by:

$$u_w(t+k) = u_{w,al}(t+k) + u_{w,CO2}(t+k) + u_{w,deh}(t+k) + \tag{56}$$
$$u_{w,fog}(t+k) + u_{w,p1}(t+k) + u_{w,p2}(t+k) + u_{w,esu}(t+k) + u_{w,edn}(t+k)$$

The state of charge of the ESU available may be represented by:

$$E_{st}(t+\Delta t+k) = E_{st}(t+k) + \eta_{Char}u_{Char}(t+k)\Delta t - \eta_{Dis}u_{Dis}(t+k)\Delta t \tag{57}$$

where $$u_{Char}(t+k) = \tag{58}$$
$$u_{pv,esu}(t+k) + u_{w,esu}(t+k) + u_{edn,esu}(t+k) + u_{CHP,esu}(t+k)$$

$$u_{Dis}(t+k) = u_{esu,al}(t+k) + u_{esu,CO2}(t+k) + \tag{59}$$
$$u_{esu,deh}(t+k) + u_{ess,fog}(t+k) + u_{esu,p1}(t+k) + u_{esu,p2}(t+k)$$

Artificial lighting, $CO_2$ injection, dehumidification, and fogging can be provided either by PV panels, wind turbine generators, the ESU, and/or the DNO. The total power consumed by these loads may be represented by the following equations, respectively:

$$u_{al}(t+k) = u_{pv,al}(t+k) + u_{w,al}(t+k) + u_{esu,al}(t+k) + u_{edn,al}(t+k) \quad (60)$$

$$u_{CO2}(t+k) = \quad (61)$$
$$u_{pv,CO2}(t+k) + u_{w,CO2}(t+k) + u_{esu,CO2}(t+k) + u_{edn,CO2}(t+k)$$

$$u_{deh}(t+k) = u_{pv,deh}(t+k) + u_{w,deh}(t+k) + u_{esu,deh}(t+k) + u_{e(in,deh}(t+k) \quad (62)$$

$$u_{fog}(t+k) = \quad (63)$$
$$u_{pv,fog}(t+k) + u_{w,fog}(t+k) + u_{esu,fog}(t+k) + u_{edn,fog}(t+k)$$

The total powers consumed by the pumping stations may be represented by:

$$u_{p1}(t+k) = u_{pv,p1}(t+k) + u_{w,p1}(t+k) + u_{esu,p1}(t+k) + u_{edn,p1}(t+k) \quad (64)$$

$$u_{p2}(t+k) = u_{pv,p2}(t+k) + u_{w,p2}(t+k) + u_{esu,p2}(t+k) + u_{edn,p2}(t+k) \quad (65)$$

The total power purchased from the DNO may be represented by:

$$u_{from\_edn}(t+k) = u_{edn,al}(t+k) + u_{edn,CO2}(t+k) + u_{edn,deh}(t+k) + \quad (66)$$
$$u_{edn,fog}(t+k) + u_{edn,p1}(t+k) + u_{edn,p2}(t+k) + u_{edn,esu}(t+k)$$

The total power sold to the DNO may be represented by:

$$u_{to\_edn}(t+k) = u_{pv,edn}(t+k) + u_{w,edn}(t+k) + u_{CHP,edn}(t+k) \quad (67)$$

Figure 4:
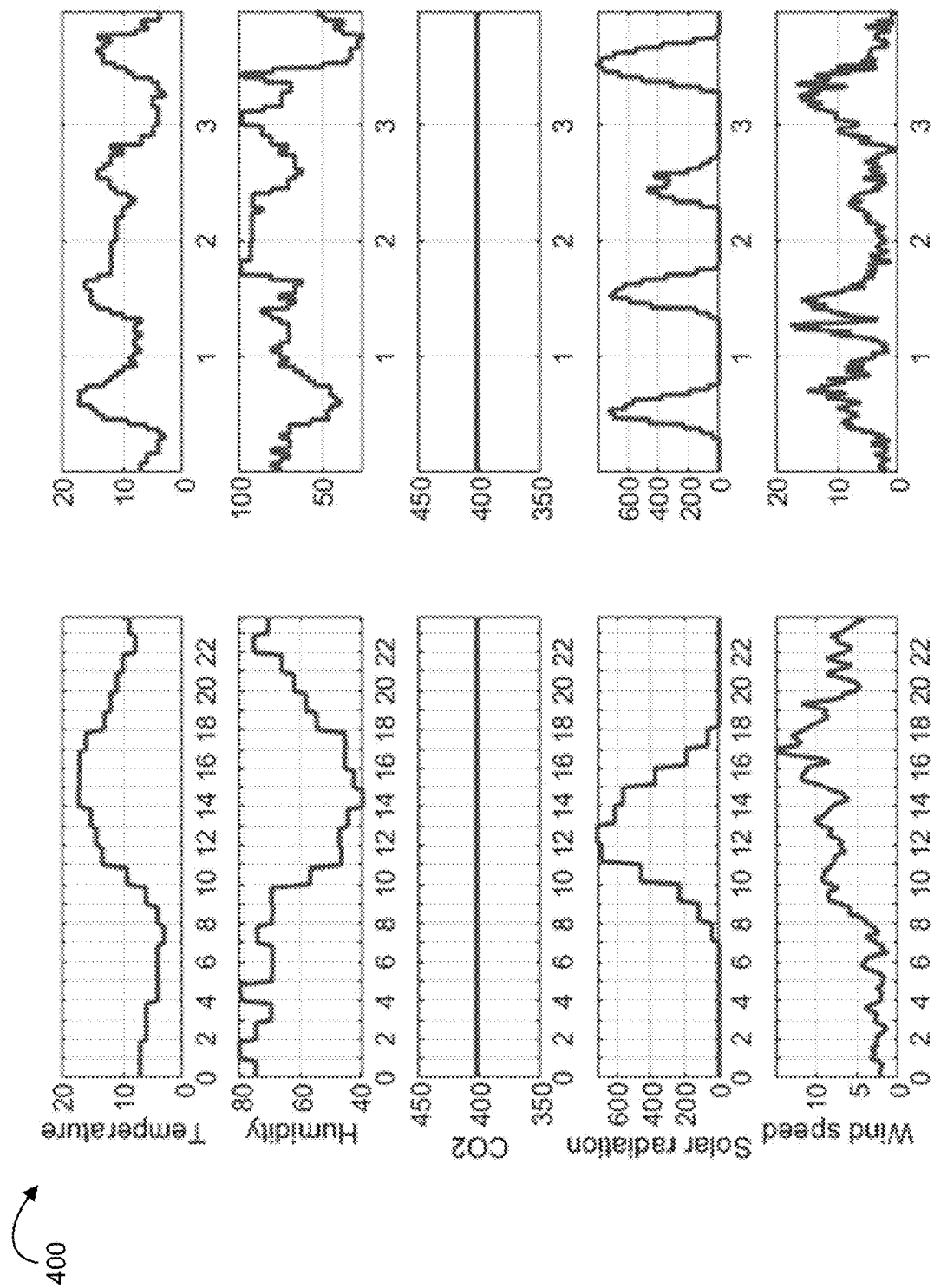
FIG. 4 illustrates examples of predicted outdoor atmospheric conditions, including temperature, humidity, CO2, solar radiance, and wind speed over 24-hour and 4-days intervals, according to some embodiments.

FIG. 4 illustrates example parameters for an example setup for simulation and testing of certain embodiments described herein. For example, FIG. 4 illustrated plots 400 for the example parameters. This example setup is not intended to limit the embodiments of the invention, but is rather provided as an example of one possible context in which certain embodiments described herein may be applicable. In this setup, the MPC-based scheduling problem was simulated and tested through several case studies, of which some are described below. Specifically, the cases described below relate to operating in a good amount of renewable generation over a 24-hour interval (case study 1), and operating in a possible worst case scenario over a 4-day interval (case study 2). The length of the prediction horizon and control horizon were set equal to 24 hours (h) and 96 h, respectively, with a control interval of 15 minutes (min).

Certain embodiments described above were utilized to apply a control strategy to a typical greenhouse 100. For the simulation and testing, the expected outdoor temperature, humidity, $CO_2$, solar radiance, and wind speed, for both case studies, are shown in FIG. 4. The tested greenhouse was connected to the DNO, the renewable generators (PV modules of 1 kilowatt (kW) and a wind turbine of 3 kW), and to an energy storage unit with a maximal capacity of 24 kW-hours (kWh) to fulfill the electric demand. The tested greenhouse included two pumping stations: one master pump that feeds the reservoir from the water source, and the second local pump dedicated to irrigation. In addition, it was equipped with a micro-CHP with a power-to-heat ratio of 0.2 for heating and cooling, a supplementary artificial light source consisting of 80 LED lamps of 28 watts (W), a CO2 injector, a dehumidifier and an advanced metering infrastructure based on a wireless sensor network.

The greenhouse was configured for the cultivation of tomatoes, specifically, where a day temperature of 22 degrees (°) Celsius (C) and a night temperature of 17° C. is optimum for tomato plant root growth and plant development, and where a diurnal increase of the indoor $CO_2$ from its ambient level to 800-1000 ppm was used for enhancing its grow rate. The adequate relative humidity needs for tomatoes ranges from 60% to 70%, and the minimum light intensity needed for the photosynthesis is 5500 lux at the plant surface with a 20-hour photoperiod.

Based on these parameters, the expected artificial lighting load reached 2.2 kW from 12:00 ante meridiem (A.M.) to 3:00 A.M. and from 6:00 post meridiem (P.M.) to 12:00 A.M. where the crop would need supplementary artificial lighting to complete its photoperiod. Since greenhouse tomatoes may need at least 0.37 meters squared ($m^2$) of soil per plant with a total planted area of 80 $m^2$, and taking into account that a tomato plant may need 2.7 liters (l) of water per day, the expected irrigation water load to be provided by the local pump was equal to 0.025 meters cubed ($m^3$) in the first interval (15 min) of each hour. The dry running protection of the local water pump was also planned. Therefore, a protection system was utilized to help ensure a minimum level of 20 percent (%) of the reservoir capacity. As explained above, this is an example setup in the context of which certain embodiments were tested. This example setup does not limit the application of certain embodiments to other contexts, such as different parameters, different plants, different values for the parameters, etc.

FIGS. 5-14 illustrate example plots of results related to the example setup illustrated in, and described with respect to, FIG. 4. These example results are provided merely as examples of results/advantages that can be achieved by certain embodiments. The example results presented in the following Figures are not intended to limit application of certain embodiments to particular contexts and/or to limit certain embodiments to particular results/advantages.

Figure 5:
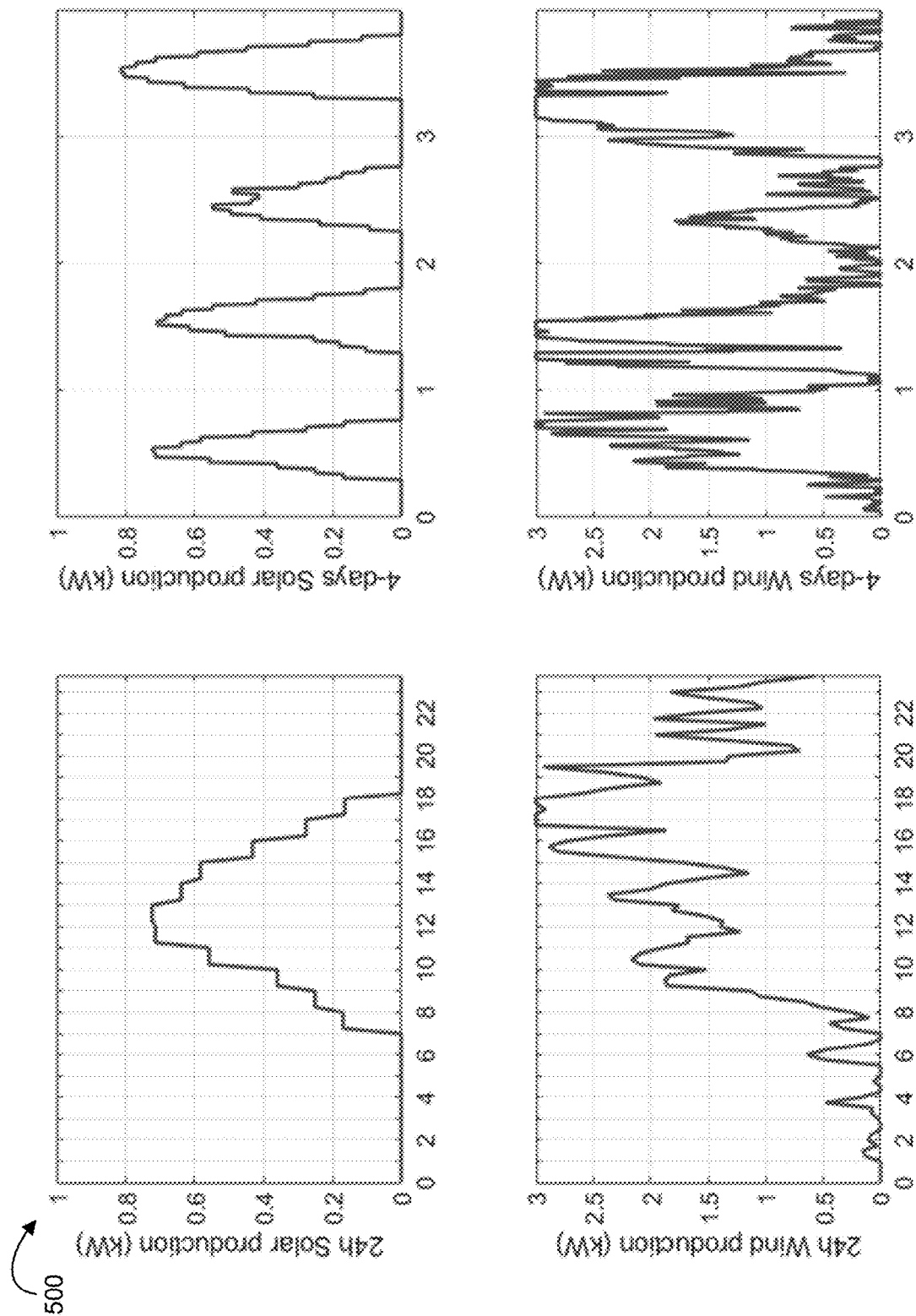
FIG. 5 illustrates an example of photovoltaic and wind production, according to some embodiments.

The case studies described above (case study 1 and case study 2) may be two example cases where the environmental conditions are favorable or unfavorable to the wind and photovoltaic production. As described below, certain embodiments as applied in the case study 1 were applied to operation or control of a greenhouse over a 24-hour interval, while certain embodiments were applied in the case study 2 to a 4-day simulation. The power produced by photovoltaic panels and wind turbine for both case studies is illustrated in FIG. 5 by plots 500. These plots shows that the peak of the generated photovoltaic power may be around noon and may follow the typical form of daily solar radiation, while the power produced by the wind turbines may be based on sudden variations of wind speed and affected by the wind turbine's stochastic character.

Figure 6:
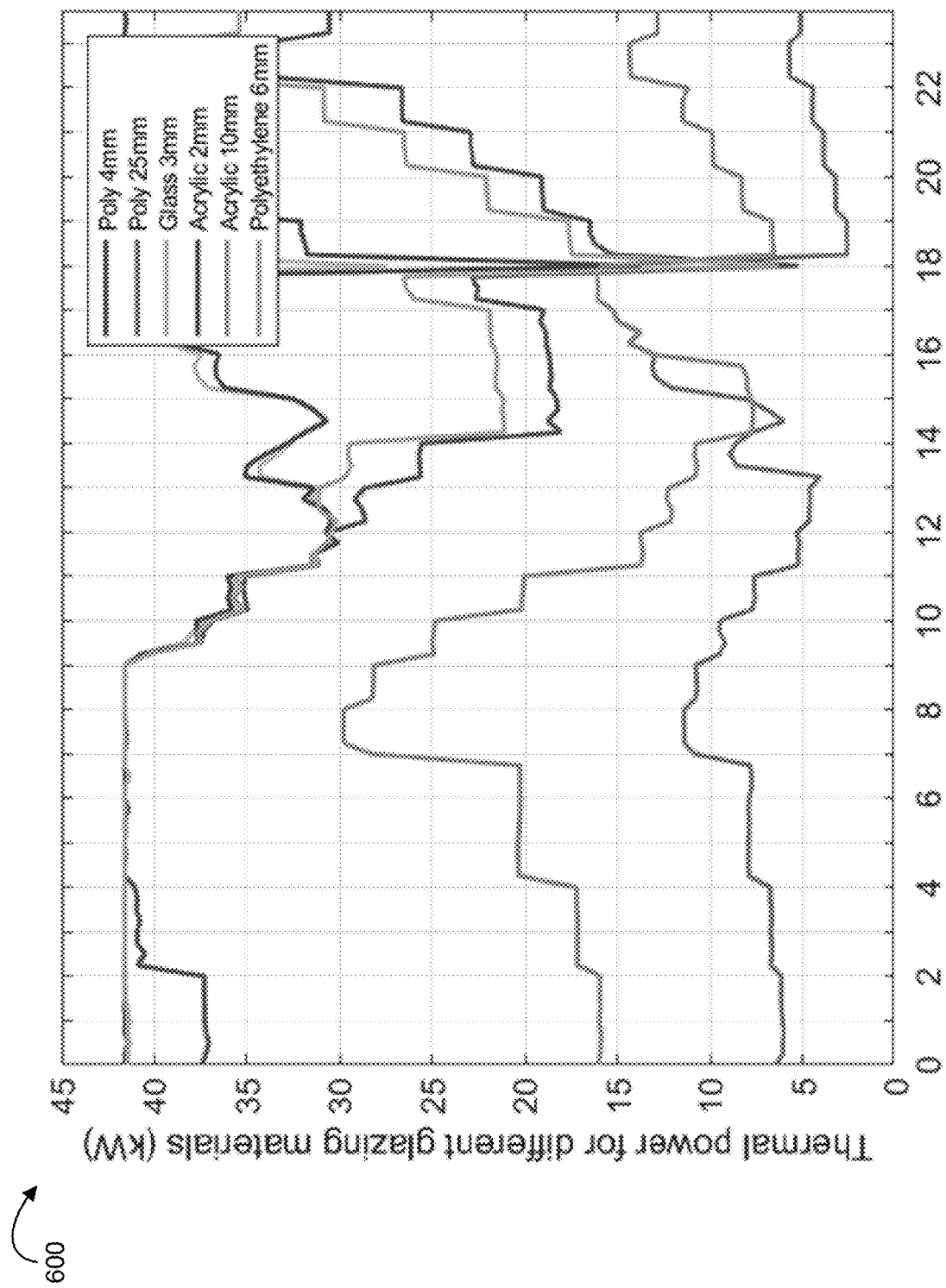
FIG. 6 illustrates an example of combined heat and power (CHP) greenhouse thermal power with different covering materials used for greenhouse glazing, according to some embodiments.

A greenhouse's structural considerations, specifically the glazing material type, may have an influence on greenhouse micro-climate management by providing more or less insulation to cold or heat, and certain embodiments described herein may incorporate such information into some operations described herein. For example, different glazing materials with different conductivities and thicknesses may provide different thermal efficiency and may impact the thermal power levels needed to set the greenhouse temperature at its optimal level. Some common materials used to cover a greenhouse can include the polycarbonate with a thickness of 4 millimeter (mm)-25 mm, glass with a thickness of 3 mm, acrylic with a thickness of 2 mm-10 mm, or polyethylene with a thickness of 6 mm. The conductivities of these materials, respectively, may be equal to 0.19, 1, 0.2, and 0.33 Watts per meter-Kelvin (W/mK). FIG. 6 illustrates a plot 600 of the simulation of MPC-based thermal power output that may be needed to raise the greenhouse temperature to a favorable temperature for various different covering materials. As illustrated, the polycarbonate 25 mm may demonstrate the minimum needed power with an hourly average gain of 31.54 kW compared to the glass. A further benefit of using the polycarbonate as a greenhouse covering material, in addition to the cost reduction of the electrical/thermal energy, may include heating a larger area with the same micro-CHP capacity, and additional benefits may result in the case of greater thicknesses. As a result, polycarbonate 25 mm may be selected to have the highest thermal resistance for the rest of the simulations described herein.

Figure 7:
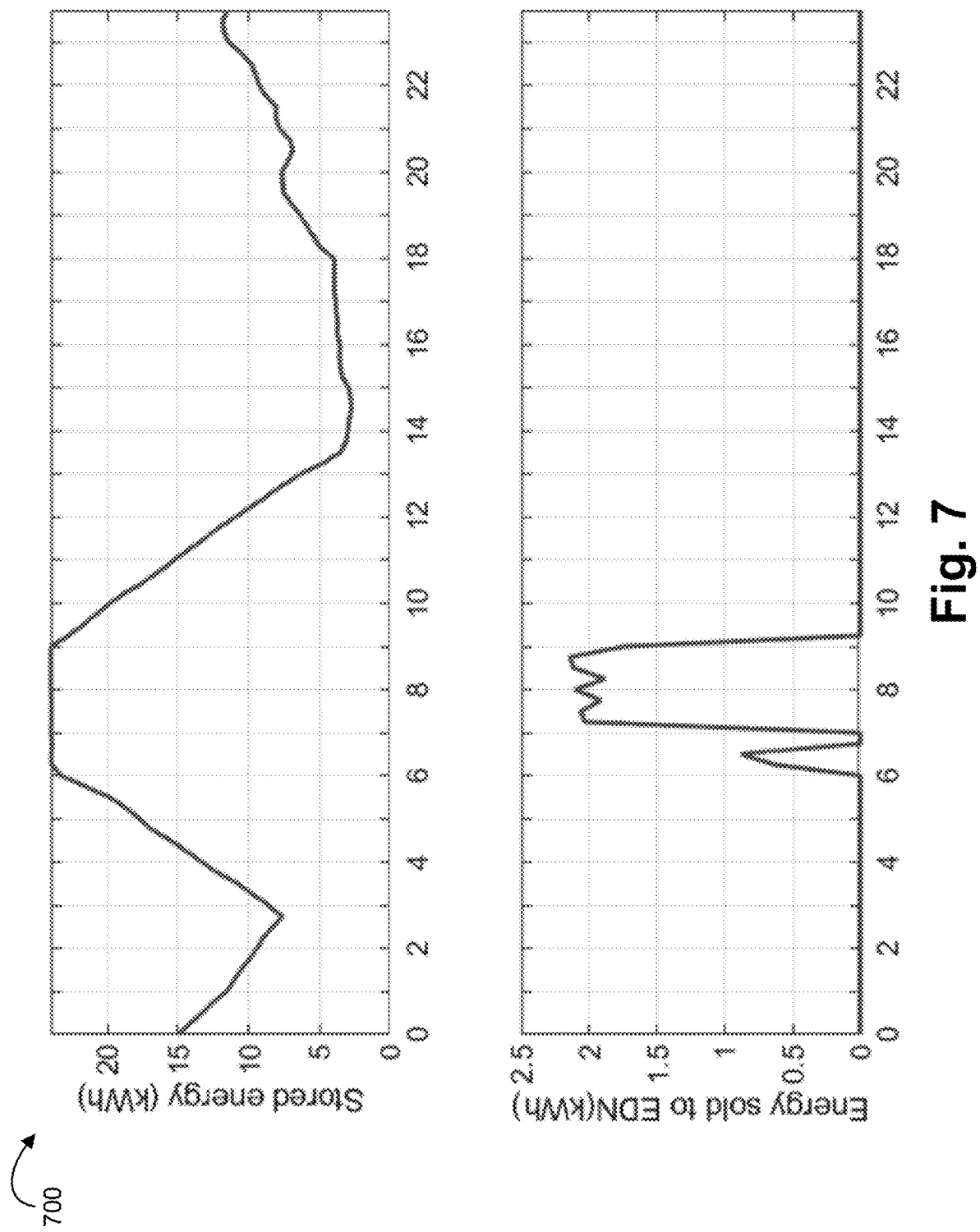
FIG. 7 illustrates an example of an energy storage unit optimal state and energy sold to a grid, according to some embodiments.

FIGS. 7-10 relate to a first example case study (case study 1) associated with the testing results illustrated in and described with respect to FIGS. 5-14. Battery charging/discharging policy may be considered as a task to be performed because it may be responsible for fulfilling the power load demand, such as during peak hours. The top plot of the plots 700 illustrated in FIG. 7 depicts the results of the MPC-based optimal behavior of the greenhouse's ESU. As illustrated, the ESU may have different trends of charge and discharge according to the availability of energy, the needed electric loads, and/or the power exchange with the DNO. For instance, in the first interval from 00:00 A.M. to 03:00 A.M., the stored energy may drop gradually from its initial value set at 15 kWh, until reaching a minimum authorized value, and this is may be due to the absence of the renewable energy production and the starting time of artificial lighting. Then, in the second interval from 03:00 A.M. to 09:00 A.M., the battery may charge until reaching a maximal capacity of 24 kWh, such as due to the low energy needed for $CO_2$ injection and/or for dehumidifying. In addition, it can be observed in the bottom plot of the plots 700 during the same interval of time, that the energy may be sold to the DNO, because wind and solar energy sources and batteries may be abundant to fulfil the loads need. From 09:00 A.M. the battery may start discharging according to the power balance between supply and demand, such as due to the high $CO_2$ injection load needed by the greenhouse in this period.

Figure 8:
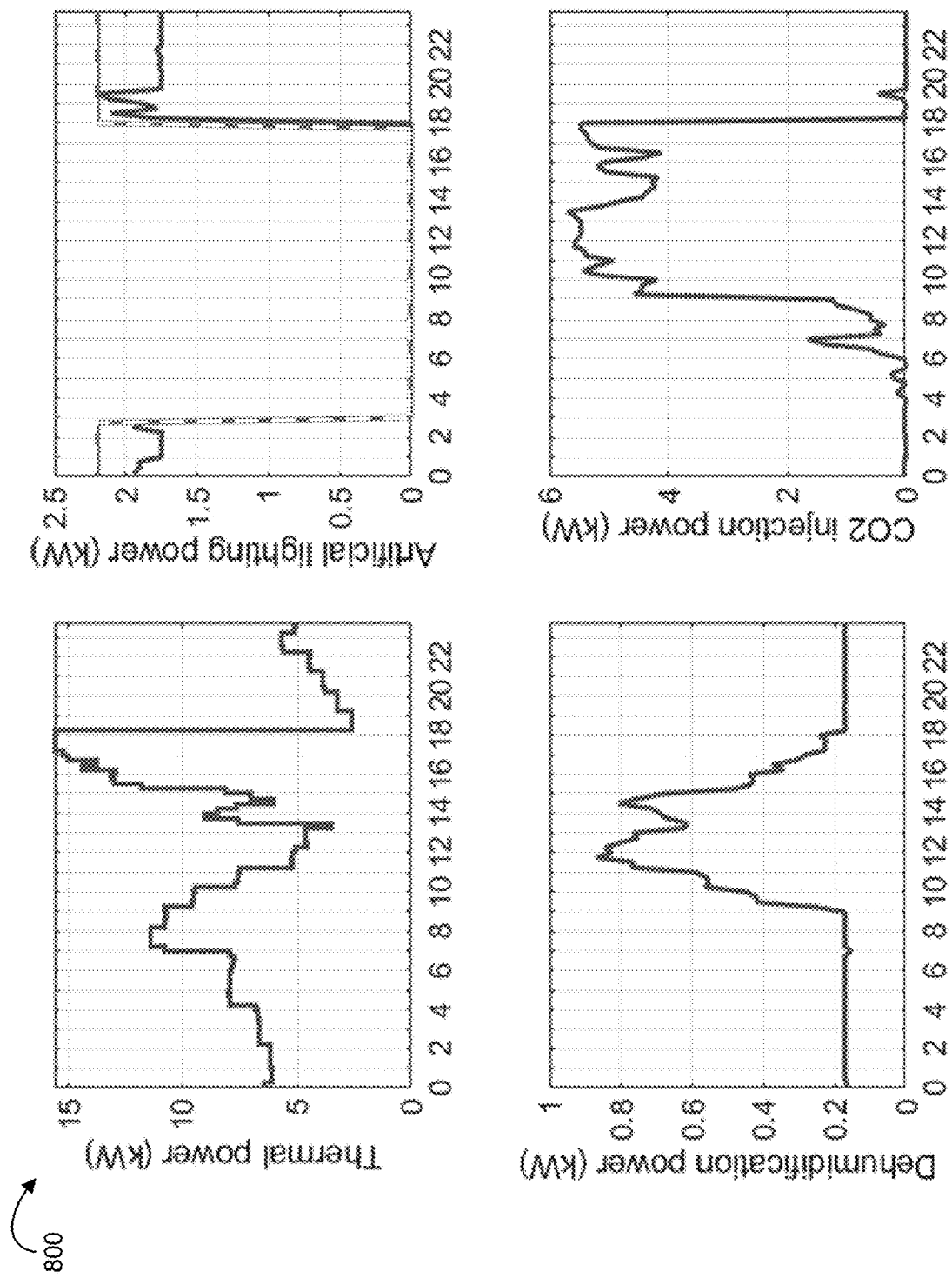
FIG. 8 illustrates an example of model predictive control-based greenhouse equipment power demands, according to some embodiments.

Optimal control decisions generated by the optimization problem following the receding horizon strategy for heating (first plot on the top left), dehumidifying (second plot on the bottom left), supplementary lighting (third plot on top right), and $CO_2$ injection (fourth plot on the bottom right) are depicted in the plots 800 of FIG. 8. As illustrated, the devices may operate within predefined power ranges to regulate the greenhouse microclimate. Certain embodiments may match the thermal and electrical power outputs of the micro CHP system and the greenhouse temperature reference signal. As can be seen, the micro CHP may be initially exploited to raise the temperature from its initial state of 15.5° C. to the optimal range (see FIG. 9).

The micro CHP may continue operating until it reaches its maximum capacity to fulfill the heat demand of the greenhouse, and then may decrease due to the change of the nighttime and daytime optimal temperatures. For the dehumidifier, it may operate during the day because of the strong relation between the temperature and humidity. Relative humidity levels may fluctuate according to greenhouse temperatures, and since the daytime temperature may be higher, the system may provide more energy to dehumidify during this interval of time. In addition, $CO_2$ injection may constitute electric load during the daytime when the plant starts breathing in $CO_2$ to promote vegetative growth. The third plot (top right) of the plots 800 of FIG. 8 illustrates a comparison between the resulted artificial lighting power (solid line) and its optimal reference signal (dashed line). As illustrated, the artificial lighting power may drop from the desired range. This may be due to the charging/discharging ESU capacity limits, the low energy produced by the micro-CHP, and/or the unavailability of the PV production. However, the crop may not be strongly affected since the supplementary lighting system may consist of a variable intensity LED illumination system configured to provide a change in light intensity versus the input power.

Figure 9:
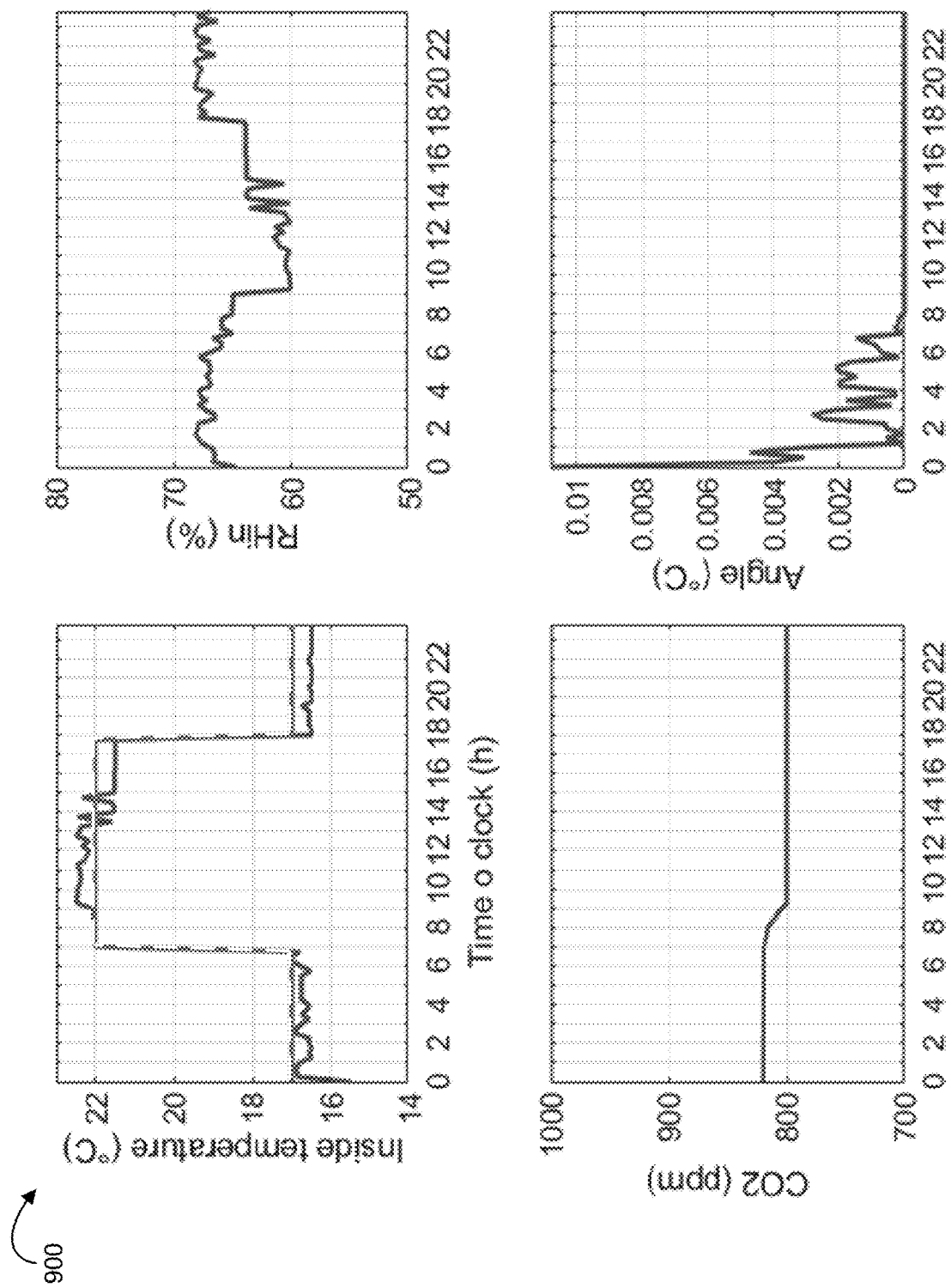
FIG. 9 illustrates an example of optimal values of a greenhouse microclimate, according to some embodiments.
Figure 10:
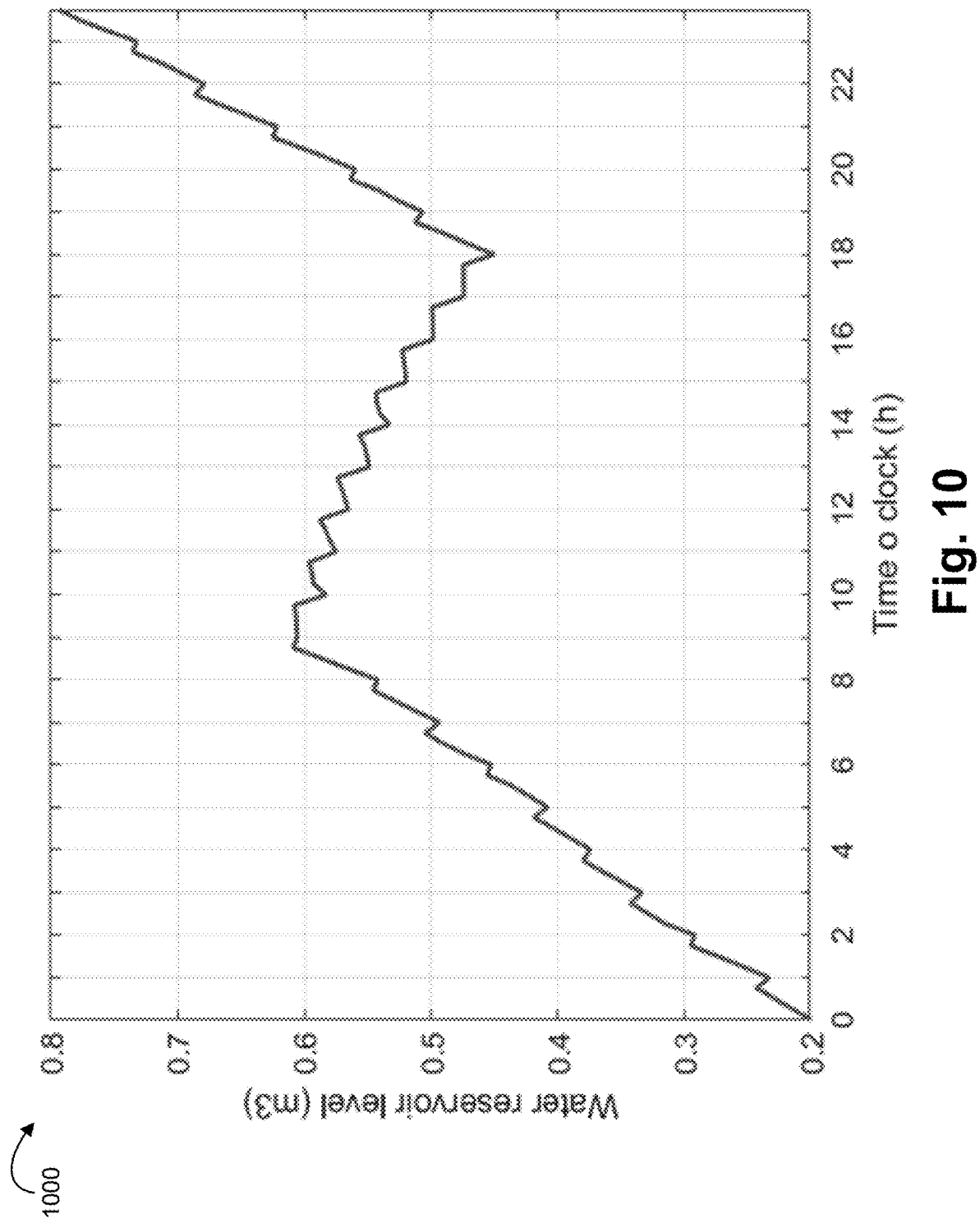
FIG. 10 illustrates an example model predictive control of a water reservoir, according to some embodiments.
Figure 11:
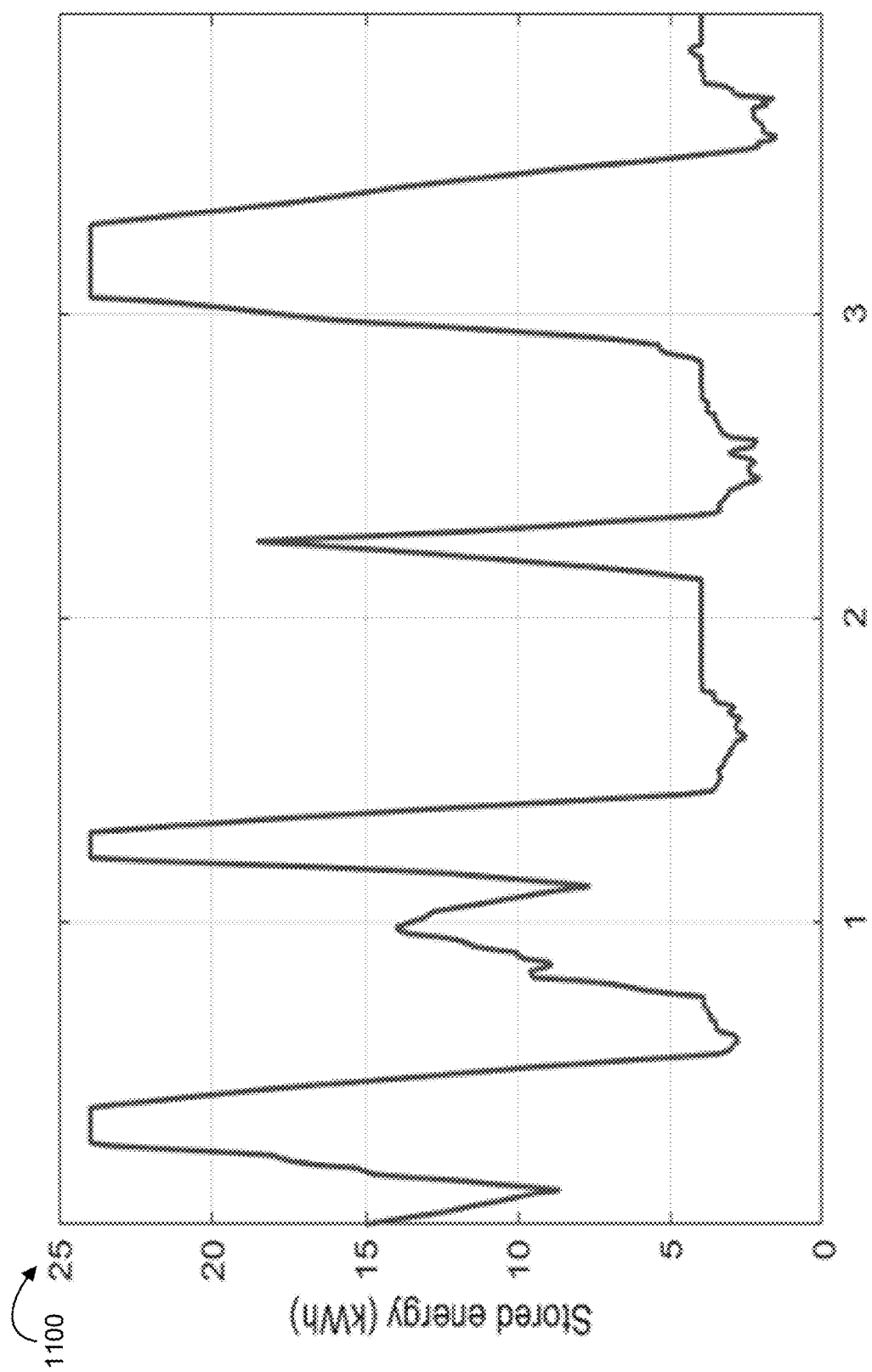
FIG. 11 illustrates an example 4-day energy storage unit optimal state, according to some embodiments.
Figure 12:
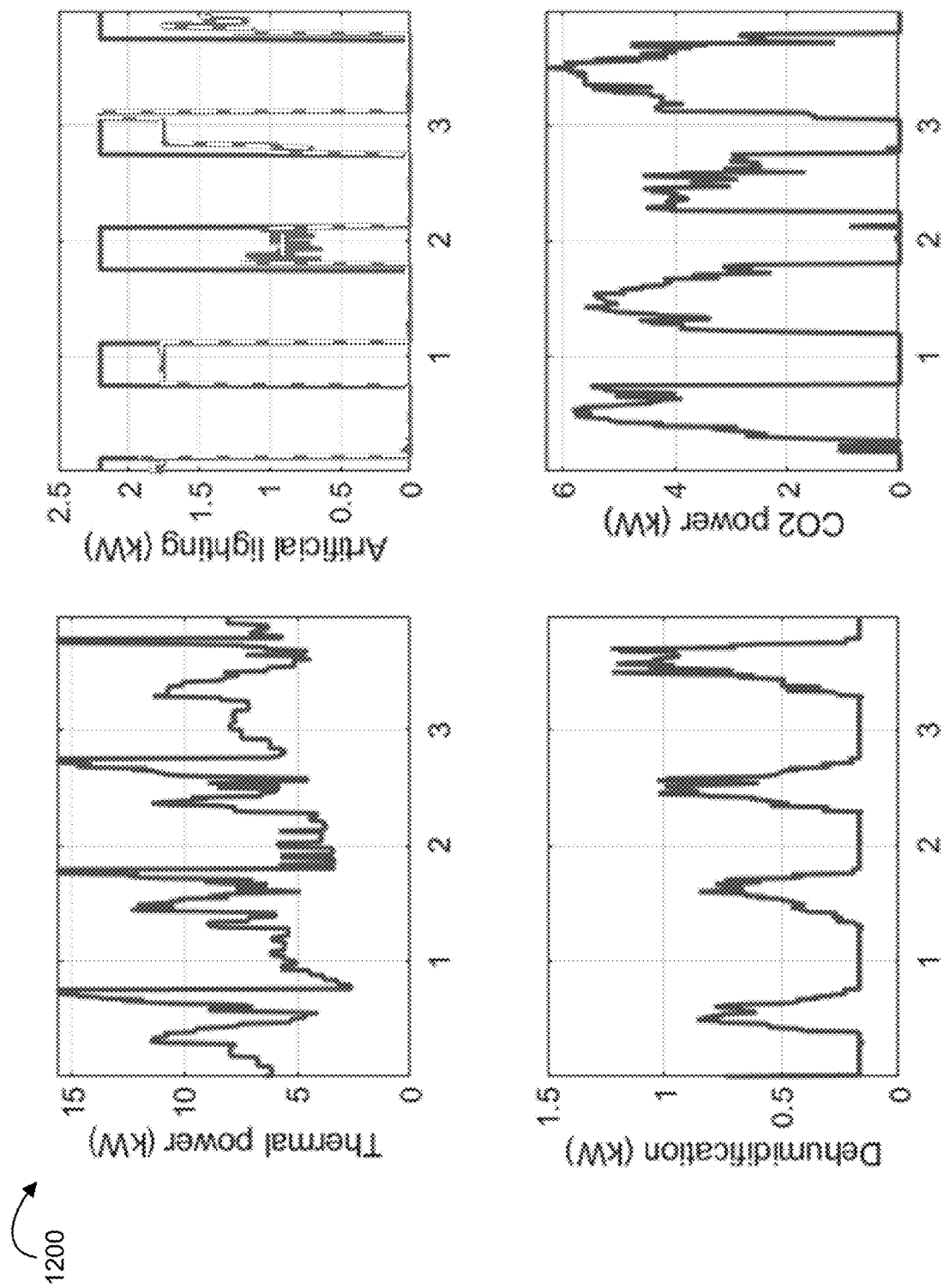
FIG. 12 illustrates an example 4-day model predictive control-based greenhouse equipment power demand, according to some embodiments.
Figure 13:
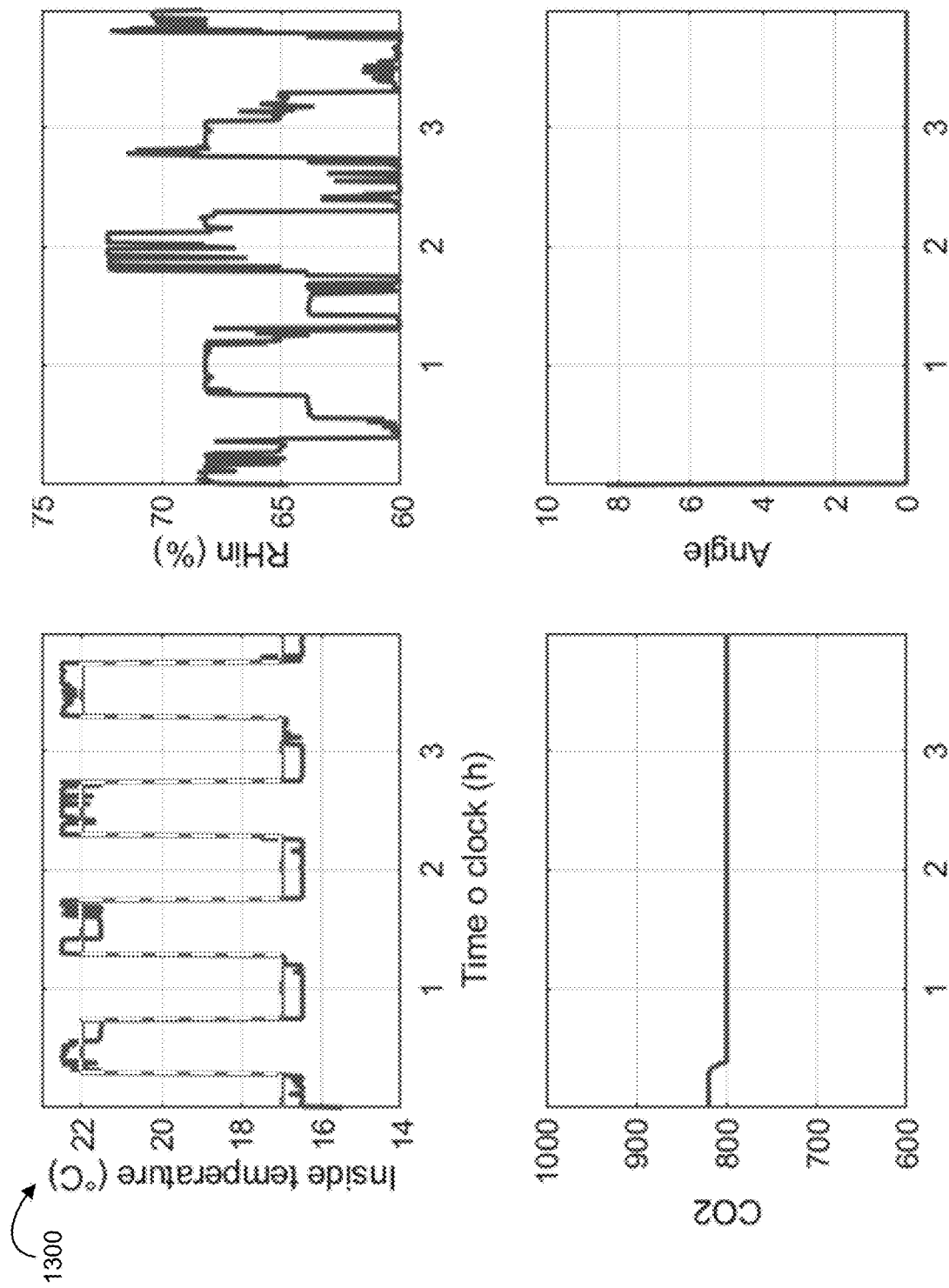
FIG. 13 illustrates example 4-day optimal values of the greenhouse microclimate, according to some embodiments.

FIG. 9 illustrates plots 900 depicting the evolution of the MPC-based optimal state of the environmental variables, including the inside temperature (first plot on the top left), CO2 concentration (second plot on the bottom left), relative humidity (third plot on the top right), and window opening angle (fourth plot on the bottom right). As illustrated, the controlled parameters may vary within predetermined ranges. Regarding the greenhouse's natural ventilation, the opening angle may be 0, which may mean that the ventilation may be deactivated to avoid the strong loss of heat and CO2, and consequently wasted energy used to compensate this air exchange loss.

The reservoir may be used to balance the water flow pumped from the water source and intended for crop irrigation. The reservoir may be designed to keep a constant water level defined by the water reference signal, by first irrigating when needed and then by storing the water when the energy is available. The evolution of the MPC-based optimal state of the water reservoir is depicted in plot 1000 of FIG. 10. As illustrated, the reservoir may have different behaviors regarding charging/discharging water depending on the availability of energy. For example, from 00:00 A.M. to 09:00 A.M. and from 06:00 P.M. to 00:00 A.M., the reservoir may be in charging mode even if the local pump is activated in the first 15 min of each hour, such as to help ensure the water loads. This may be due to the presence of the ESU energy in the first interval and the wind power in the second. However, from 09:00 A.M. to 06:00 P.M., the reservoir may be in discharging mode because of the CO2 enrichment high power load. In the examples depicted, the master pump installed at the reservoir level may demonstrate an ability to handle the water-level fluctuations by maximizing the storage potential.

Figure 14:
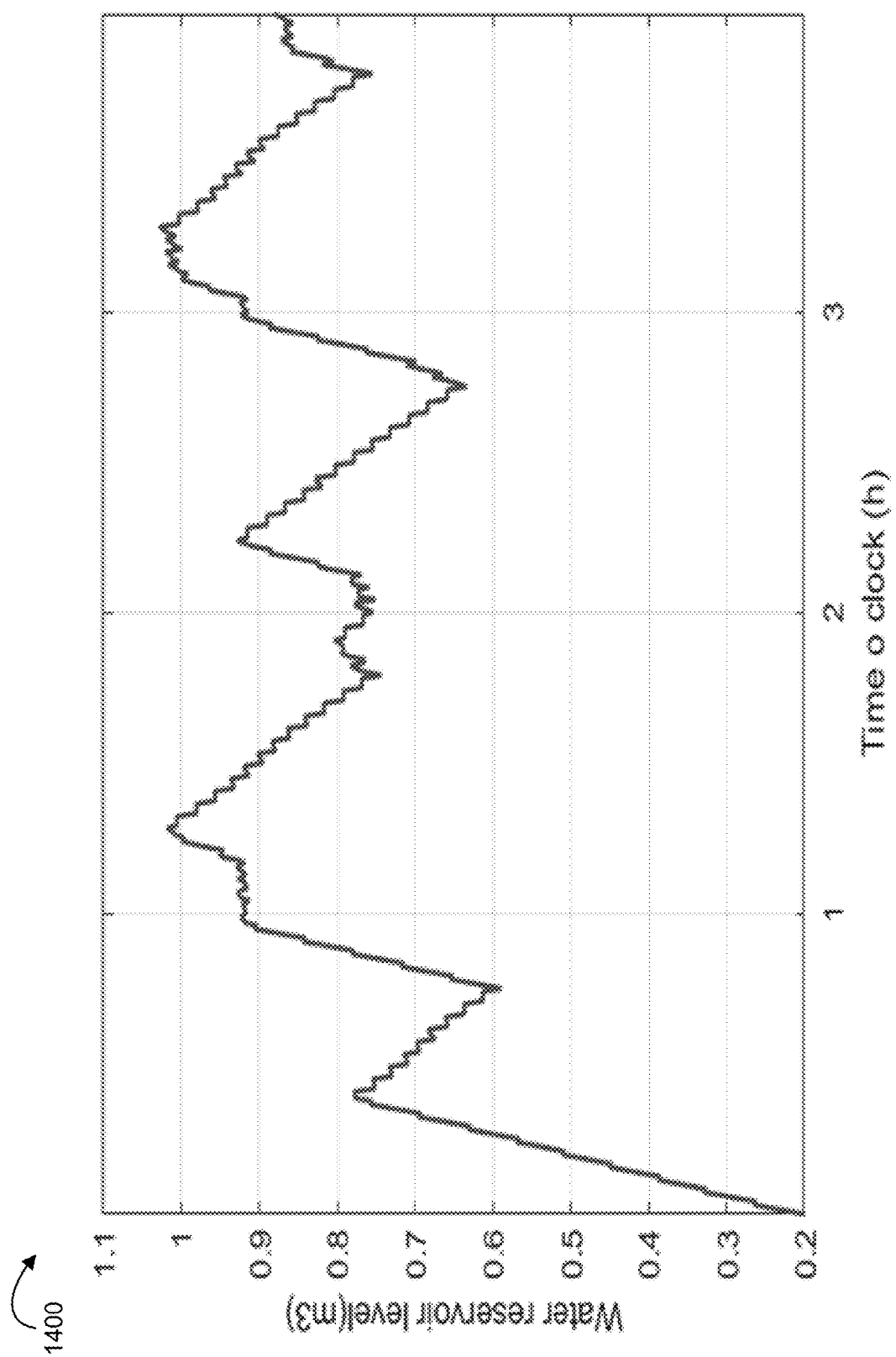
FIG. 14 illustrates an example 4-day model predictive control of a water reservoir, according to some embodiments.

FIGS. 11-14 relate to a second example case study (case study 2) associated with the testing results illustrated in and described with respect to FIGS. 5-14. This second case study may relate to the same simulations described above but with different control and prediction horizons to show the continuity of the results over 4 days. As illustrated in these Figures, the ESU may reply to the high electrical appliances' consumption by discharging the stored energy while making sure to handle lower and upper ESU bounds' constraints (see plot 1100 in FIG. 11). The portion of the plot associated with the third day (at 2 to 3 on the horizontal axis) can be considered as a possible worst case due to the low energy production (see the top right plot of the plots 500 in FIG. 5 for energy production), which may have resulted in a low energy storage, a zero sale to the DNO, and/or a violation of humidity reference tracking. As shown in the plots 1200 of FIG. 12 and the plots 1300 of FIG. 13, the relative humidity may not be satisfied during this interval of time, even if the dehumidifier did not reach its maximum capacity, because of the conditions of high outdoor relative humidity and limited available energy. In addition, the artificial lighting power values may have seen the largest declines during that time for the same reasons. One or more other controlled parameters, as well as the control actions, may have been kept within acceptable ranges. FIG. 14 illustrates plots 1400 depicting the time varying four days water reservoir level.

Figure 15:
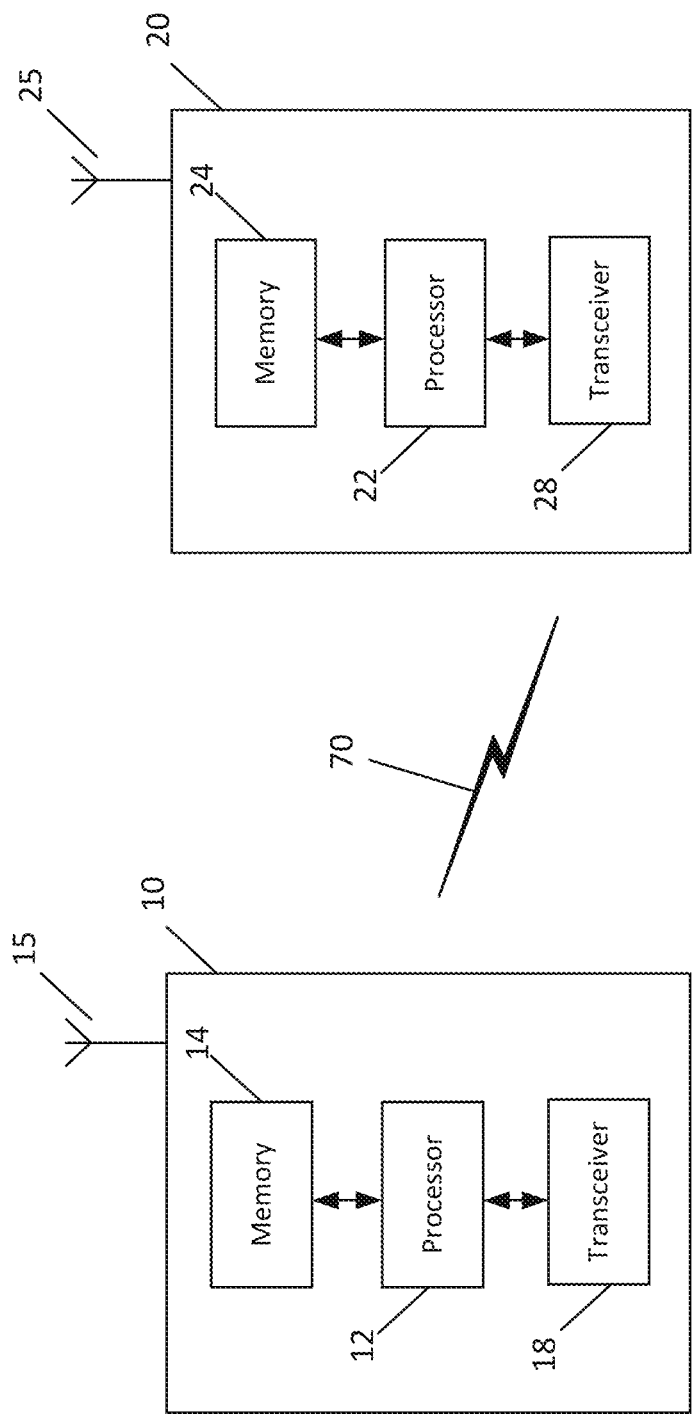
FIG. 15 illustrates an example block diagram of apparatuses, according to an embodiment.

FIG. 15 illustrates an example of an apparatus 10 and an apparatus 20 according to an embodiment. In an embodiment, apparatus 10 and/or apparatus 20 may be an element in the system illustrated in, or described with respect to, FIGS. 1-14. For example, apparatus 10 and/or apparatus 20 may be a system 102 (or a device thereof), a sensor 104 or 106, a device of electricity supply network 108, EMS 110, an SMU 212, a MCC 214, and/or the like.

In some example embodiments, apparatus 10 may include one or more processors, one or more computer-readable storage medium (for example, memory, storage, or the like), one or more radio access components (for example, a modem, a transceiver, or the like), one or more actuators (e.g., for actuating a mechanical component), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in, or different than, FIG. 15, depending on the device to which apparatus 10 corresponds.

As illustrated in the example of FIG. 15, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 15, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for receiving a signal and for transmitting another signal from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. In other embodiments, apparatus 10 may include an input and/or output device (I/O device), such as a display, a button or touch control, a speaker, a microphone, a camera, and/or the like. In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with an apparatus 20 (which may be similar to apparatus 10) via a wireless or wired communications link 70 according to any radio access technology.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

According to certain embodiments, apparatus 10 may be controlled by memory 14 and processor 12 to perform the functions associated with example embodiments described herein. For example, in some embodiments, apparatus 10 may be configured to perform one or more of the processes described with respect to, or depicted in, FIGS. 1-14.

For instance, in one embodiment, apparatus 10 may be controlled by memory 14 and processor 12 to initiate a state of a greenhouse; to acquire new environmental data from sensors; to update model predictions; to compute a predicted renewable power generation; to perform an optimization calculation; and to generate a control signal.

Therefore, certain example embodiments provide several technological improvements, enhancements, and/or advantages over existing technological processes. For example, one benefit of some example embodiments is improved management of environmental conditions of a greenhouse, which may conserve energy and/or resources that would otherwise be used in the cultivation of plants in a greenhouse. Accordingly, the use of some example embodiments results in improved functioning of greenhouses and associated devices related to control of the environmental conditions and, therefore constitute an improvement at least to the technological field of greenhouse-control for cultivation, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single EMS, sensor, etc. equally applies to embodiments that include multiple instances of the EMS, sensor, etc., and vice versa. In addition, although certain embodiments have been described in the context of environmental control of a greenhouse, certain embodiments described herein may be broadly applicable to other contexts, such as environmental control of a building other than a greenhouse (e.g., an office building, a warehouse, etc.), or for purposes other than cultivation of plants (e.g., maintenance of animals, storage of goods or products, etc.).

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

| PARTIAL GLOSSARY | |
|---|---|
| 1. Sets | |
| T | Set of time intervals in scheduling horizon |
| 2. Environment variables | |
| $\Phi_{out}$ | Outdoor temperature [° C.] |
| $RH_{out}$ | Outdoor relative humidity [%] |
| $CO_2^{out}$ | Outdoor $CO_2$ concentration [ppm] |
| $v_{wind}$ | Wind speed [m/s] |
| I | Outdoor sunlight intensity [W/m2] |
| 3. System variables | |
| $\Phi_{in}$ | Indoor temperature [° C.] |
| $RH_{in}$ | Indoor relative humidity [%] |
| $CO_2^{in}$ | Indoor $CO_2$ concentration [ppm] |
| $I_{in}$ | Indoor light intensity [W/m2] |
| α | Window opening angle [deg] |
| 4. Control variables | |
| $u_{heat}^{th}$ | Thermal power of the micro-CHP [kW] |
| $u_{heat}^{el}$ | Electric power of the micro-CHP [kW] |
| $u_{vent}$ | Natural ventilation air flow [m³/m² · h] |
| $u_{CO2}$ | $CO_2$ enrichment by injection[g/m² · h] |
| $u_{CO2}^{st}$ | Operation status of CO2 enrichment $0 \le u_{CO2}^{st} \le 1$ |
| $u_{al}$ | Artificial lighting power [kW] |
| $u_{fog}^{st}$ | Operation status of fogging $0 \le u_{fog}^{st} \le 1$. |

-continued

PARTIAL GLOSSARY

| | |
|---|---|
| $u_{fog}$ | Fogging power [kW] |
| $u_{deh}^{st}$ | Operation status of dehumidification $0 \leq u_{deh}^{st} \leq 1$ |
| $u_{deh}$ | Dehumidification power [kW] |
| $u_{p1}$ | Master pump power [W] |
| $u_{p2}$ | Local pump power [W] |

5. Parameters

| | |
|---|---|
| $\Delta t$ | Time interval[h] 1 |
| A | Area of the greenhouse [m$^2$] 80 |
| H | Height of the greenhouse [m] 3.5 |
| V | Volume of the greenhouse [m$^3$] 280 |
| $I_{sc}$ | PV module short circuit current [A] 8.66 |
| $I_{mp}$ | PV module maximum power current [A] 8.06 |
| $V_{mp}$ | PV module maximum power voltage [V] 37.2 |
| $V_{oc}$ | PV module open circuit voltage [V] 46.19 |
| $I_{st}$ | Standard light intensity 1000 |
| $\mu$ | PV module voltage temperature coefficient [V/° C.] −0.45 |
| $\gamma$ | PV module current temperature coefficient [A/° C.] 0.05 |
| $\eta_{pv, s}$ | Serial connection number of PV modules 4 |
| $\eta_{pv, p}$ | Parallel connection number of PV module strings 1 |
| $\eta_{loss}$ | PV connection loss 0.9 |
| $u_{pv, min}$ | PV power output lower bound [kW] 0 |
| $u_{pv, max}$ | PV power output upper bound [kW] 1 |
| $P_w$ | Wind turbine nominal power [kW] 3 |
| $v_c$ | Wind speed at start up [m/s] 2.5 |
| $v_r$ | Nominal wind speed [m/s] 12 |
| $v_f$ | Maximum wind speed [m/s] 25 |
| $u_{w, min}$ | Wind turbine power output lower bound [kW] 0 |
| $u_{w, max}$ | Wind turbine power output upper bound [kW] 3 |
| $\eta_{Char}$ | Efficiency of battery charge 0.9 |
| $\eta_{Dis}$ | Efficiency of battery discharge 0.9 |
| $u_{Char}$ | Power charged to the battery [kW] |
| $u_{Dis}$ | Power discharged from the battery [kW] |
| $\overline{E_{st}}$ | Desired stored energy in the battery [kWh] |
| $E_{st, min}$ | Energy storage unit lower bound [kWh] 4 |
| $E_{st, max}$ | Energy storage unit upper bound [kWh] 24 |
| $u_{Char, min}$ | Charging lower bound [kW] |
| $u_{Char, max}$ | Charging upper bound [kW] 3 |
| $u_{Dis, min}$ | Discharging lower bound [kW] |
| $u_{Dis, max}$ | Discharging upper bound [kW] 3 |
| $F_s$ | Water flow entering the reservoir [m$^3$] |
| $F_{gh}$ | Water flow dedicated to feed the greenhouse needs [m$^3$] |
| $\overline{F_{gh}}$ | Desired water flow [m$^3$] 0.025 |
| $\eta_s$ | Efficiency of the master pump 0.75 |
| $\eta_{gh}$ | Efficiency of the local pump 0.8 |
| $d_s$ | Master pump head [m] 50 |
| $d_{gh}$ | Local pump head [m] 5 |
| $\rho$ | Water Density [kg/m3] 1000 |
| $\bar{r}$ | Desired water level in the reservoir [m$^3$] 1 |
| $r_{min}$ | Reservoir lower bound [m$^3$] 0.2 |
| $r_{max}$ | Reservoir upper bound [m$^3$] 1.2 |
| $R_{th}$ | Thermal resistance of the greenhouse glazing material [° C./kW] 1.6447 |
| $C_{air}$ | Heat capacity of indoor air, 0.525 [Kwh/° C.] |
| e | Glazing material thickness [mm] 25 |
| k | Glazing material conductivity [W/m · K] 0.19 |
| $\eta_{el}$ | Electric efficiency of the micro-CHP |
| $\eta_{th}$ | Thermal efficiency of the micro-CHP |
| $\overline{\Phi_{in}}$ | Desired indoor temperature [° C.] 17/22 |
| $\Phi_{in, min}$ | Minimum optimal temperature [° C.] 16.5/21.5 |
| $\Phi_{in, max}$ | Maximum optimal temperature [° C.] 17.5/22.5 |
| $u_{heat, min}^{th}$ | Micro-CHP thermal power lower bound[kW] 0 |
| $u_{heat, max}^{th}$ | Micro-CHP thermal power upper bound [kW] 15.6 |
| $u_{heat, min}^{elc}$ | Micro-CHP electric power lower bound [kW] 0 |
| $u_{heat, max}^{elc}$ | Micro-CHP electric power upper bound [kW] 3.2 |
| K1 | Constant 100 |
| K2 | Constant [Pa]1.7001 |
| K3 | Constant [Pa]7.7835 |
| K4 | Constant [1/K]1/17.0789 |
| K5 | Constant [kgwater/kgair]0.6228 |
| $P_{atm}$ | Atmospheric air pressure [Pa] 101325 |
| $\rho_a$ | Air density [kg/m3] 1.27 |
| $W_{evp}$ | Crop evaporation at each hour [kg/m$^2$ h] 0.1258 |
| $W_{fog}^{max}$ | Max. water rate of fogging systems [kg/m$^2$ h] 0.0096 |
| $W_{deh}^{max}$ | Max. rate of dehumidifier [kg/m$^2$ h]; 1.6 |
| $P_{deh}$ | Dehumidifier rated power [kW] 2.2 |
| $P_{fog}$ | Fogging system rated power [kW] |
| $\overline{RH^{in}}$ | Desired relative humidity [%] 0.65 |
| $RH_{in, min}$ | Minimum optimal relative humidity [%] 60 |
| $RH_{in, max}$ | Maximum optimal relative humidity [%] 70 |
| K6 | Coefficients associated with the respiration rate of the crop [° C.] −0.27 |
| K7 | Coefficients associated with the respiration rate of the crop (no dim.); 0.05. |
| $K_{inj}^{max}$ | Max. carbon injected by CO2 generator [kg/m2] 0.8e-3. |
| $K_{res}$ | Respiration coefficient of crops [kg/(m2 h K))] 1.224e-6 |
| $K_{phot}$ | Photosynthesis coefficient of crops [kg/Wh] 165.708e-3. |
| $P_{CO2}$ | CO2 generator rated power [kW] 8 |
| $\overline{CO_2^{in}}$ | Desired indoor CO$_2$ rate [ppm] 820 |
| $CO_2^{in, min}$ | Minimum optimal CO$_2$ rate [ppm] 800 |
| $CO_2^{in, max}$ | Maximum optimal CO$_2$ rate [ppm] 1000 |
| $A_v$ | Vent opening [m$^2$] 1 |
| $\alpha_{min}$ | Minimum window opening [deg] 0 |
| $\alpha_{max}$ | Maximum window opening [deg] 44 |
| $H_v$ | Vertical dimension of the ventilation opening [m] |
| g | Gravity acceleration constant [m/s$^2$] 9.8 |
| $C_d$ | Discharge coefficient of the vent opening |
| $C_w$ | Wind effect coefficient |
| L | Light intensity [lux] 5500 |
| $\overline{u_{al}}$ | Desired artificial lighting load [kW] 2.2 |
| $\eta_l$ | LED efficiency [lm/W] 200 |
| $I_{min}$ | Minimum light intensity [W/m$^2$] |

We claim:

1. A method, comprising:
   initiating, by a device, a state of a greenhouse;
   acquiring new environmental data from one or more sensors after initiating the state of the greenhouse;
   updating one or more model predictions based on the acquired data;
   computing a predicted renewable power generation of one or more renewable energy sources after updating the one or more model predictions;
   performing an optimization calculation based on the one or more model predictions or the predicted renewable power generation; and
   generating a control signal based on the optimization calculation,
   wherein the control signal is to control one or more systems associated with the greenhouse, wherein the one or more systems are associated with controlling environmental conditions within the greenhouse.

2. The method according to claim 1, wherein the state is of at least one of:
   an energy storage unit,
   a water reservoir,
   a renewable energy power generation,
   an inside temperature of the greenhouse,
   a carbon-dioxide level within the greenhouse,
   a lighting load within the greenhouse, or
   an angle of an opening of a vent of the greenhouse.

3. The method according to claim 1, wherein initiating the state of the greenhouse further comprises:
   utilizing a state equation related to computing a state of at least one of:
   photovoltaic power generation,
   power generated by a wind turbine generator, a charge of an energy storage unit,
a total power consumed by artificial lighting,
carbon-dioxide injection,
dehumidification,
fogging,
a total power consumed by one or more pumping stations,
a total power purchased from a distributed network operator, or
a total power sold to the distributed network operator.

4. The method according to claim 1, further comprising:
initiating a timer or a counter prior to acquiring the new environmental data, wherein the timer or the counter is associated with controlling a quantity of times that the device performs the acquiring the new environmental data, the updating the one or more model predictions, the computing the predicted renewable power generation, the performing the optimization calculation, or the generating the control signal.

5. The method according to claim 4, further comprising:
determining whether the timer or the counter indicates that the quantity of times has satisfied a threshold; and either:
performing the acquiring the new environmental data, the updating the one or more model predictions, the computing the predicted renewable power generation, the performing the optimization, or the generating the control signal for an additional time, or
terminating further operations.

6. The method according to claim 1, wherein the one or more sensors comprise at least one of:
one or more internal environmental sensors that monitor an internal environment of the greenhouse, or
one or more external environmental sensors that monitor an external environment of the greenhouse.

7. The method according to claim 1, wherein the one or more systems comprise at least one of:
a heating or cooling system,
an artificial lighting system,
a fogging system, or
a carbon-dioxide injector system.

8. An apparatus, comprising:
at least one processor; and
at least one memory including computer program code,
wherein the at least one memory and the computer program code are configured to, with the at least one processor, cause the apparatus at least to:
initiate a state of a greenhouse;
acquire new environmental data from one or more sensors after initiating the state of the greenhouse;
update one or more model predictions based on the acquired data;
compute a predicted renewable power generation of one or more renewable energy sources after updating the one or more model predictions;
perform an optimization calculation based on the one or more model predictions or the predicted renewable power generation; and
generate a control signal based on the optimization calculation,
wherein the control signal is to control one or more systems associated with the greenhouse, wherein the one or more systems are associated with controlling environmental conditions within the greenhouse.

9. The apparatus according to claim 8, wherein the at least one memory and the computer program code are configured to, with the at least one processor, further cause the apparatus, when updating the model predictions, at least to:
predict external environmental conditions of the greenhouse or internal environmental conditions of the greenhouse based on the data.

10. The apparatus according to claim 8, wherein the renewable power generation is associated with one or more photovoltaic panels or one or more wind turbine generators.

11. The apparatus according to claim 8, wherein the at least one memory and the computer program code are configured to, with the at least one processor, further cause the apparatus, when performing the optimization calculation, at least to:
perform the optimization calculation utilizing an objective function, wherein the objective function includes one or more quadratic errors between one or more manipulated variables and reference trajectory signals.

12. The apparatus according to claim 8, wherein the at least one memory and the computer program code are configured to, with the at least one processor, further cause the apparatus, when initiating the state of the greenhouse, at least to:
utilize a state equation related to computing a state of at least one of:
photovoltaic power generation,
power generated by a wind turbine generator,
a charge of an energy storage unit,
a total power consumed by artificial lighting,
carbon-dioxide injection,
dehumidification,
fogging,
a total power consumed by one or more pumping stations,
a total power purchased from a distributed network operator, or
a total power sold to the distributed network operator.

13. The apparatus according to claim 8, wherein the at least one memory and the computer program code are configured to, with the at least one processor, further cause the apparatus at least to:
perform the acquiring the new environmental data, the updating the one or more model predictions, the computing the predicted renewable power generation, the performing the optimization, and the generating the control signal for a threshold amount of time or a threshold quantity of iterations.

14. The apparatus according to claim 8, wherein the at least one memory and the computer program code are configured to, with the at least one processor, further cause the apparatus at least to:
determine whether the timer or the counter indicates that the threshold amount of time or the threshold quantity of iterations has been satisfied; and
either:
perform the acquiring the new environmental data, the updating the one or more model predictions, the computing the predicted renewable power generation, the performing the optimization, or the generating the control signal for an additional time period or iteration, or
terminate further operations.

15. An apparatus, comprising:
means for initiating a state of a greenhouse;
means for acquiring new environmental data from one or more sensors after initiating the state of the greenhouse;
means for updating one or more model predictions based on the acquired data;

means for computing a predicted renewable power generation of one or more renewable energy sources after updating the one or more model predictions;
means for performing an optimization calculation based on the one or more model predictions or the predicted renewable power generation; and
means for generating a control signal based on the optimization calculation,
  wherein the control signal is to control one or more systems associated with the greenhouse, wherein the one or more systems are associated with controlling environmental conditions within the greenhouse.

16. The apparatus of claim 15, further comprising:
means for utilizing a state equation related to computing a state of at least one of:
  photovoltaic power generation,
  power generated by a wind turbine generator,
  a charge of an energy storage unit,
  a total power consumed by artificial lighting,
  carbon-dioxide injection,
  dehumidification,
  fogging,
  a total power consumed by one or more pumping stations,
  a total power purchased from a distributed network operator, or
  a total power sold to the distributed network operator.

17. The apparatus of claim 15, further comprising:
means for initiating a timer or a counter prior to acquiring the new environmental data, wherein the timer or the counter is associated with controlling a quantity of times that the apparatus performs the acquiring the new environmental data, the updating the one or more model predictions, the computing the predicted renewable power generation, the performing the optimization calculation, or the generating the control signal.

18. The apparatus of claim 17, further comprising:
means for determining whether the timer or the counter indicates that the quantity of times has satisfied a threshold; and
either:
  means for performing the acquiring the new environmental data, the updating the one or more model predictions, the computing the predicted renewable power generation, the performing the optimization calculation, or the generating the control signal an additional time, or
  means for terminating further operations.

19. The apparatus of claim 15, wherein the means for updating the one or more model predictions further comprises:
means for predicting external environmental conditions of the greenhouse or internal environmental conditions of the greenhouse based on the data.

20. The apparatus of claim 15, wherein the means for performing the optimization calculation further comprises:
means for performing the optimization calculation utilizing an objective function, wherein the objective function includes one or more quadratic errors between one or more manipulated variables and reference trajectory signals.

* * * * *